(12) United States Patent
Kim

(10) Patent No.: US 9,189,087 B2
(45) Date of Patent: Nov. 17, 2015

(54) INPUT SYSTEM AND METHOD FOR DETECTING TOUCH USING THE SAME

(71) Applicant: LG Display Co., Ltd., Seoul (KR)

(72) Inventor: Ha-Zoong Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 316 days.

(21) Appl. No.: 13/719,373

(22) Filed: Dec. 19, 2012

(65) Prior Publication Data
US 2014/0043283 A1 Feb. 13, 2014

(30) Foreign Application Priority Data

Aug. 13, 2012 (KR) .................. 10-2012-0088539

(51) Int. Cl.
*G06F 3/0354* (2013.01)
*G06F 3/041* (2006.01)
*G06F 3/044* (2006.01)

(52) U.S. Cl.
CPC ............ *G06F 3/03545* (2013.01); *G06F 3/044* (2013.01); *G06F 3/0416* (2013.01); *G06F 2203/04106* (2013.01); *G06F 2203/04112* (2013.01)

(58) Field of Classification Search
CPC .... G06F 3/03545; G06F 3/044; G06F 3/0416
USPC ......................... 345/174, 173, 179
See application file for complete search history.

(56) References Cited

U.S. PATENT DOCUMENTS

| | | | | |
|---|---|---|---|---|
| 4,902,858 A * | 2/1990 | Yamanami et al. ........ 178/18.07 | | |
| 5,528,002 A | 6/1996 | Katabami | | |
| 5,693,914 A * | 12/1997 | Ogawa ........................ 178/18.07 | | |
| 8,643,618 B2 * | 2/2014 | Yu .................................. 345/173 | | |
| 2008/0156546 A1 * | 7/2008 | Hauck ........................ 178/19.01 | | |
| 2010/0328249 A1 | 12/2010 | Ningrat et al. | | |
| 2011/0273384 A1 * | 11/2011 | Yeh et al. ....................... 345/173 | | |
| 2012/0038370 A1 * | 2/2012 | Yeh et al. ....................... 324/629 | | |
| 2012/0050207 A1 | 3/2012 | Westhues et al. | | |
| 2012/0086422 A1 | 4/2012 | Ito et al. | | |

(Continued)

FOREIGN PATENT DOCUMENTS

| CN | 201721186 U | 1/2011 |
|---|---|---|
| EP | 2267587 A2 | 12/2010 |

(Continued)

OTHER PUBLICATIONS

Office Action dated Aug. 22, 2014, issued by the Taiwanese Intellectual Property Office in Taiwanese Patent Application No. 101148489.

(Continued)

*Primary Examiner* — Fred Tzeng
(74) *Attorney, Agent, or Firm* — Morgan, Lewis & Bockius LLP

(57) ABSTRACT

An input system and a method for detecting touch using the same are provided. An input system includes: a sensor panel including first and second channels crossing each other, a stylus pen including: a first coil and a second coil divided from each other, a resonance capacitor and a switch serially connected to the second coil, and a conductive tip connected to the first coil, a stylus ground connected to the stylus pen, an antenna loop formed in an outer region of the sensor panel, and a touch controller connected to the first and second channels and the antenna loop.

24 Claims, 21 Drawing Sheets

(56) References Cited

U.S. PATENT DOCUMENTS

| | | | |
|---|---|---|---|
| 2012/0105361 A1 | 5/2012 | Kremin et al. | |
| 2012/0105362 A1 | 5/2012 | Kremin et al. | |
| 2012/0113065 A1* | 5/2012 | Chin | 345/179 |
| 2012/0182254 A1 | 7/2012 | Jang et al. | |
| 2013/0162589 A1* | 6/2013 | Lien et al. | 345/174 |
| 2013/0342510 A1* | 12/2013 | Yeh et al. | 345/179 |

FOREIGN PATENT DOCUMENTS

| | | |
|---|---|---|
| KR | 10-2011-0057385 A | 6/2011 |
| TW | M423861 U1 | 3/2012 |
| TW | 201230634 A | 7/2012 |
| TW | M433596 U1 | 7/2012 |
| WO | 2007/129085 A2 | 11/2007 |
| WO | 2012/057887 A1 | 5/2012 |

OTHER PUBLICATIONS

Office Action dated Dec. 31, 2013, issued by the Korean Patent Office for Korean Patent Application No. 10-2012-0088539.

Search Report dated Feb. 3, 2015, issued by the European Patent Office in European Patent Application No. 12198457.9.

* cited by examiner

INPUT SYSTEM AND METHOD FOR DETECTING TOUCH USING THE SAME

CROSS-REFERENCE TO RELATED APPLICATION(S)

This application claims priority under 35 U.S.C. §119 from Korean Application No. 10-2012-0088539, filed on Aug. 13, 2012, the entire disclosure of which is incorporated herein by reference for all purposes.

BACKGROUND

1. Field

The following disclosure relates to an input system and a method for detecting touch using the same, more particularly, to an input system that is able to realize a stylus pen with no battery in a display device and to detect touch using a human finger or a stylus pen, and a method for detecting touch using the same.

2. Background

As the world officially entered the information technology era, techniques for a display device configured to present an electrical information signal into a visual image have grown rapidly. To meet the demands of the rapidly growing display techniques, various types of flat display devices with desirable features have been developed which can be substituted for conventional cathode ray tube (CRT) devices. Such features include small thickness, light weight, and low power consumption.

Typical examples of such a flat panel display device include a liquid crystal display device (LCD), a plasma display panel device (PDP), a field emission display device (FED), an electro luminescence display device (ELD), and the like. Those examples commonly include a flat display panel configured to realize an image as an essential component. Such a flat display panel has a structure in that an optical anisotropic film or a luminance film is disposed between a pair of transparent insulator substrates bonded oppositely.

Such a display device having the above-mentioned structure increasingly requires a touch panel that can recognize a touch position via human fingers or auxiliary input means to transmit corresponding information to meet the recognized touch position. Currently, such a touch panel is applied as an attach-type panel attached to an outer surface of the display device.

According to a touch detecting method, the touch panel is classified into a resistance type, a capacitance type, and infrared ray detecting type. In view of the manufacture system convenience and the sensing ability, the capacitance type touch panel has been receiving more attention recently.

Mobile devices, such as a smart phone, a smart book, and the like, have become more popular as HIDs (Human Interface Devices) using a human finger or using a stylus pen that enables writing or drawing as an input device. A stylus pen input enables more detailed input and gives advantages of detailed drawing and writing.

A capacitance-type touch screen in a related art will be described as follows, with reference to the accompanying drawings.

FIG. 1 is a circuit diagram of a capacitance-type touch detecting circuit in a related art. FIG. 2 is a graph of voltage output based on the time divided according to presence of a finger touch using the circuit diagram of FIG. 1.

As shown in FIG. 1, a capacitance-type touch detecting circuit includes a first electrode (Tx) and a second electrode (Rx), an amplifier 5 receiving a reference voltage (Vref) via a (+) input terminal, and a capacitor (Cs) formed between an output terminal of the amplifier 5 and an (−) input terminal.

In this instance, the first electrode (Tx) receives an input voltage (Vin) via a pad provided in an end thereof and senses an output voltage (Vout) output from the amplifier 5 via a pad provided in an end of the second electrode (Rx).

A square wave of typically 2-3 μs is used as a touch driving signal and applied to the first electrode (Tx). A voltage value in proportion to a value of mutual capacitance variation (ΔCm) between the first and second electrodes (Tx and Rx) is sensed as the output voltage (Vout).

As time passes after the square wave is applied as an input voltage as shown in FIG. 2, the output voltage (Vout) is increased in case of finger touch. When there is a finger touch, a finger contacts with the electrode, and the mutual capacitance variation (ΔCm) decreases. Accordingly, the rate of increase of the output voltage (Vout) is decreased (as in the dotted line in FIG. 2), and such decrease is calculated at a cross section between each Tx channel and each Rx channel. Coordinates of the finger touch can be extracted from such data.

However, when the touch detecting circuit of FIG. 1 is used in stylus pen touch as well as finger touch, a contact area of a sensor panel face positioned in a top of a stylus pen is relatively small and it is difficult to sense mutual capacitance variation in touch implemented by the stylus pen, because mutual capacitance Cm between electrodes is small. Accordingly, the accuracy of coordinate extraction might be deteriorated.

Moreover, when a tip of the stylus pen is smaller than the electrode provided in a sensor panel for sensing, coordinate distortion could be generated thereby affecting the sensitivity of the sensor directly.

When the finger touch and the stylus pen touch use the same touch detecting circuit, one disadvantage is that touch implemented by the palm in contact with the electrode in the stylus pen input cannot be distinguished from the touch implemented by the stylus pen. In other words, in the detecting circuit shown in FIG. 1, it is difficult to have palm rejection in the stylus pen touch module.

Another driving module for detecting touch by another driving module, for instance, an electromagnetic driving module different from the stylus pen touch or finger touch is introduced. In this instance, an auxiliary panel that can be detected by an auxiliary electromagnetic driving module has to be further provided, rather than only the capacitance type electrode. Accordingly, the number of essential components is increased, and necessary processes have to be increased disadvantageously.

The capacitance-type touch screen in a related art has following disadvantage.

First, the contact area of the sensor panel face of the tip possessed by the stylus pen is relatively small and the mutual capacitance variation (ΔCm) is small. Accordingly, it is difficult to sense the variation of the mutual capacitance in the touch implemented by the stylus pen and the accuracy of the coordination extraction can be deteriorated.

Second, when the tip of the stylus pen is smaller than the electrode provided in the sensor panel for sensing, there could be coordinate distortion according to presence of the electrode, thereby causing sensitivity deterioration of the sensor.

Third, there is a disadvantage of failure in distinguishing the touch implemented by the palm in contact with the electrode in the stylus pen input from the touch implemented by the stylus pen. In other words, it is difficult for the capacitance-type touch screen in the related art to have the function of palm rejection in the touch implemented by the stylus pen.

Fourth, the method for detecting the stylus pen touch according to another driving module that is different from the driving module of the finger touch, for instance, the electromagnetic type driving module is introduced. However, in this instance, an auxiliary panel that can be detected by an auxiliary electromagnetic driving module has to be further provided, rather than the capacitance type electrode. Accordingly, the number of essential components is increased and necessary processes have to be increased disadvantageously.

SUMMARY

Embodiments of the present invention relate to an input system and a method for detecting touch using the same. To solve the problems, an object of embodiments may be to provide an input system that is able to realize a stylus pen with no battery and to detect both touch implemented by a finger and touch implemented by a stylus pen, and a method for detecting touch using the same.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the embodiments, as embodied and broadly described herein, there is provided an input system, comprising: a sensor panel including first and second channels crossing each other, a stylus pen including: a first coil and a second coil divided from each other, a resonance capacitor and a switch serially connected to the second coil, and a conductive tip connected to the first coil, a stylus ground connected to the stylus pen, an antenna loop formed in an outer region of the sensor panel, and a touch controller connected to the first and second channels and the antenna loop.

In another aspect, there is provided a method for detecting touch using an input system including a sensor panel including first and second channels crossing each other, a stylus pen including a first coil and a second coil divided from each other, a resonance capacitor and a switch serially connected to the second coil, and a conductive tip connected to the first coil, an antenna loop formed in an outer region of the sensor panel, the method including: dividing finger touch sensing and stylus pen touch sensing for each frame based on time.

It is to be understood that both the foregoing general description and the following detailed description are examples and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
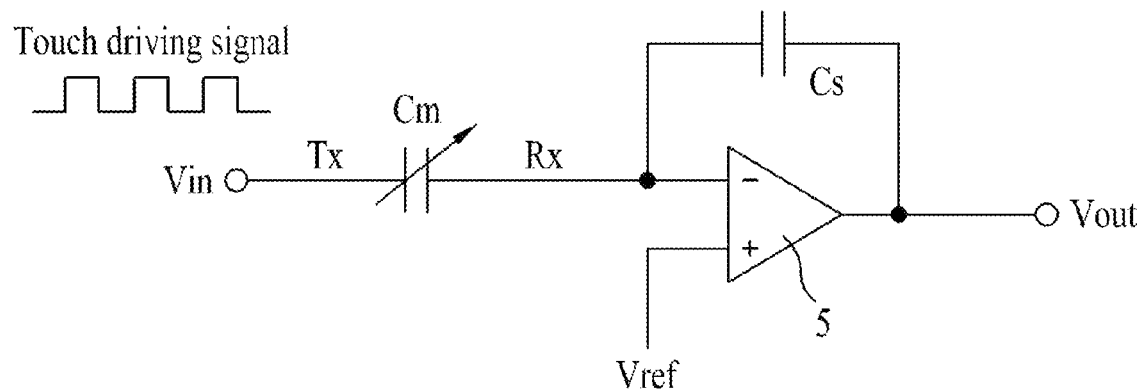
FIG. 1 is a circuit diagram of a capacitance type touch detecting circuit in a related art.
Figure 2:
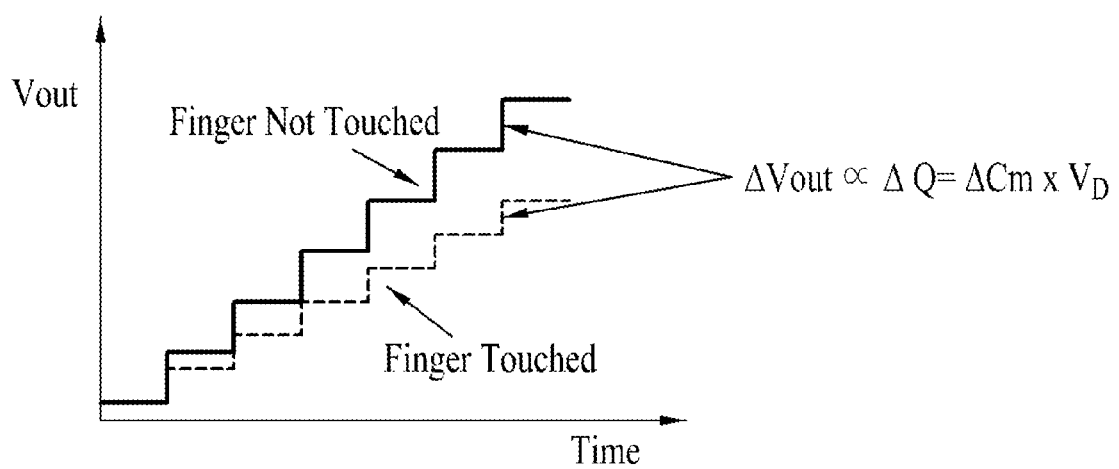
FIG. 2 is a graph showing voltage output based on the time divided according to presence of finger touch using the circuit diagram of FIG. 1.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

An input system according to an embodiment and a method for detecting touch using the same will be described as follows, referring to the accompanying drawings.

An input system according to an embodiment may use a structure of a capacitance-type touch detecting with respect to finger touch. When detecting touch implemented by a stylus pen, touch detecting may be enabled by a resonance circuit provided in a stylus pen and resonance via an antenna loop provided outside a sensor panel. In other words, the capacitance-type stylus pen touch detecting with limitation on touch detecting may be enabled by an outer structure of a sensor panel and variation of a circuit provided in the stylus pen, with no auxiliary panel and no influence of a contact area or an electrode pattern.

The first coil and the second coil may be wound around magnetic core positioned in an axial direction of the stylus pen.

The first coil and the second coil, the resonance capacitor, and the magnetic core may be provided in the stylus pen, and a conductive body having a hole the conductive tip may be partially projected through may be provided in the stylus pen.

The conductive body may be connected to the stylus ground.

The switch may be formed of elastic rubber and insulated from the conductive tip, to be operated by the pressure applied to the conductive tip.

The switch may be connected to the second coil and insulated from the magnetic core.

An end of the first coil may be connected to the conductive tip and the other end thereof may be connected to the conductive body.

The antenna loop may receive an inductance signal resonant from the second coil provided in the stylus pen when the stylus pen touches a face of the sensor panel.

The antenna loop may be formed to surround an outer area of the sensor panel and pads may be provided in both ends of the antenna loop, respectively, and connected to the touch controller.

The stylus ground may be a user contacting with the conductive body or a wire connected between the conductive body and the sensor panel.

The touch controller may include an amplifier connected to the antenna loop to amplify a difference of voltages received by the ends of the antenna loop, a filter unit connected to the amplifier to filter noise, a converter connected to the filter unit to convert an analog signal into a digital signal, a signal processor connected to the converter to extract a coordinate by collecting the digital signal, and a drive signal generator configured to generate a signal applied to each of the channels provided in the sensor.

When the stylus pen touches the sensor panel, the switch may be closed and the second coil and the resonance capacitor may form a closed circuit.

The signal applied to each of the channels by the drive signal generator may apply a square wave or sine wave at the same frequency as the resonance frequency in the closed circuit.

The stylus pen touch sensing may be enabled by applying signals to the first and second channels sequentially and detecting touch according to the voltage difference received by both ends of the antenna loop for each channel.

The touch detecting may be enabled by electrically connecting the sensing capacitor between the conductive tip and the sensor panel and the first coil, forming a resonance circuit of a resonance capacitor and the second coil after the switch may be closed, and transmitting an electromagnetic resonance induced electromotive force to the antenna loop by mutual inductance between the first coil and the second coil.

The signal applied to each of the channels by the drive signal generator may apply a square wave or sine wave at the same frequency as the resonance frequency in the closed circuit.

The first coil and the second coil, the resonance capacitor and the magnetic core may be provided in the stylus pen, and a conductive body having a hole the conductive tip may be partially projected through may be further provided in the stylus pen, and the other end of the first coil may be connected to the conductive body.

The ground may be implemented by a user when a user touching the stylus pen on a face of the sensor panel. The user directly may contact the conductive body when implementing the ground.

The conductive body may be connected to the sensor panel via a wire, and the wire may be connected to a ground terminal provided in the sensor panel.

The antenna loop and the first and second channels may include pads, respectively, to be connected with each other by a touch controller to enable touch detecting by voltage detecting and signal applying.

The touch detecting implemented to the first and second channels sequentially by the touch controller may include: detecting a voltage difference received by the antenna loop, amplifying the voltage difference, filtering noise from the amplified voltage difference, converting an analog signal of the amplified voltage difference having the noise filtered there into a digital signal, and storing the digital signal in the memory, and a step of detecting a touch coordinate by calculating the digital signal stored in the memory for each of the first and second channels.

The number of periods where the signals may be applied to the first and second channels may correspond to a value given after dividing periods where stylus pen touch sensing periods in one frame by the number of the first and second channels.

Periods where signals may be applied to the first and second channels may correspond to some of the number of periods given after diving stylus pen touch sensing periods in one frame by the number of the first and second channels. Optionally, the induced electromotive force of the antenna loop may be detected in the other ones of the periods given after dividing the stylus pen touch sensing periods by the number of the first and second channels, except the periods in which the signals may be applied to the first and second channels.

The input system and the method for detecting touch using the same according to an embodiment may have the following advantageous effects.

First, embodiments may use the structure of capacitance type touch detecting with respect to the finger touch. Accordingly, it may be possible to detect touch by resonance via the antenna loop positioned in the outer region of the sensor panel and the resonance circuit in the stylus pen. That is, the stylus pen touch detecting implemented by the capacitance type touch detecting can be enabled by changing the internal circuit of the stylus pen and the outer structure of the sensor panel, with no auxiliary panel and with no influence of the electrode pattern shape or the contact area.

Second, compared with the configuration having correspondingly different panels for the finger touch and the stylus pen touch, the input system according to an embodiment can reduce the production cost and simplify the manufacture process. In addition, a thin sensor panel may be used as the input system.

Third, the touch detecting may be enabled by the resonant operation between the resonance circuit provided in the stylus pen and the antenna loop provided in the sensor panel. Accordingly, no battery has to be mounted in the stylus pen and the production cost of the input system according to an embodiment can be reduced, compared with the active stylus pen requiring an auxiliary power supply. Also, a light and compact stylus pen can be realized.

Fourth, the stylus pen touch and the finger touch can be separately detected by different driving modules. The palm rejection of the stylus pen touch can be eased and the accuracy of the touch sensitivity can be improved accordingly.

Fifth, rather than the mutual capacitance variation Δ cm between electrodes crossing each other which may be used in the capacitance type, the sensing capacitance generated between the stylus pen and one electrode may be used in the touch detecting according to an embodiment. Compared with the related art, a larger sensing capacitance value may be used in detecting the stylus pen touch. Accordingly, the improvement of the sensitivity may be expected.

Sixth, the frequency signal of the resonance circuit provided in the stylus pen may be determined based on the synchronization of the drive signals applied to the electrodes provided in the sensor panel. Auxiliary writing pressure or special button pushing can be applied to the input system easily.

Seventh, the antenna loop used in detecting the stylus pen touch may be positioned in the outer region spaced apart from the active region where electrodes crossing each other may be formed with respect to the edge area where the sensitivity may be deteriorated. Accordingly, the sensitivity of the stylus pen can be maintained uniformly, regardless of the regions.

The structure of a capacitance-type electrode provided in an active area and touch implemented by a stylus pen will be described as follows.

Figure 3:
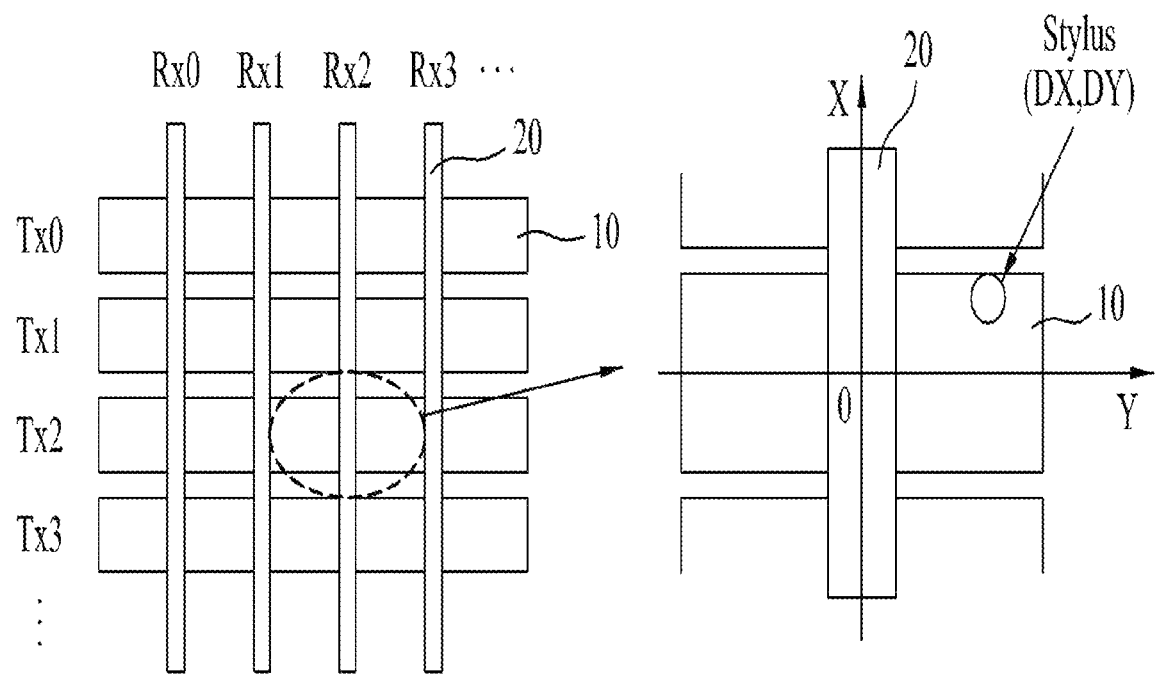
FIG. 3 is a plane view illustrating a structure of an active region provided in an input system according to an embodiment.
Figure 4:
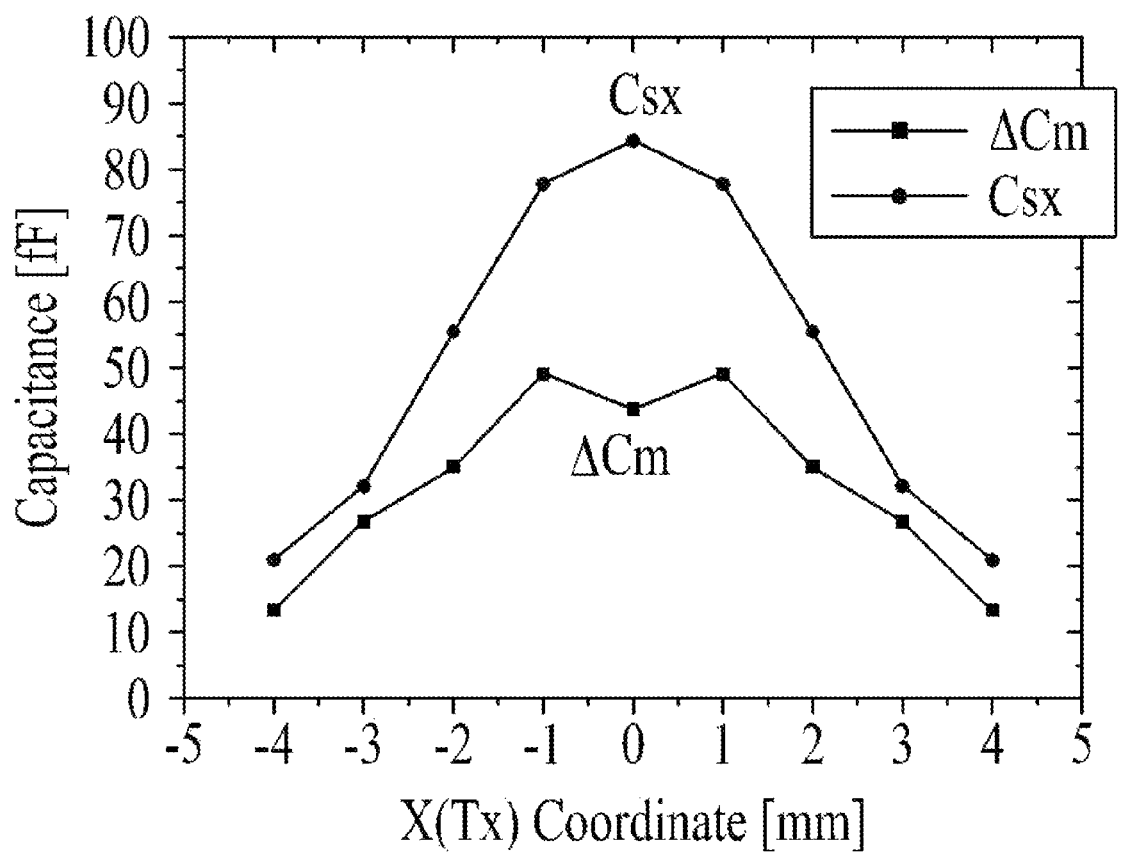
FIG. 4 is a graph illustrating a capacitance (Csx) between a stylus pen and Tx channel and a value of capacitance variation between Tx channel and Rx channel according to presence of a stylus pen in the input system of FIG. 3.

FIG. 3 is a plane view illustrating a structure of an active region provided in an input system according to an embodiment. FIG. 4 is a graph illustrating capacitance versus position for a capacitance (Csx) between a stylus pen and transmission (Tx) channel and a value of capacitance variation between Tx channel and reception (Rx) channel according to presence of a stylus pen in the input system of FIG. 3.

As shown in FIG. 3, Tx and Rx channels may be bar-shaped, Tx and Rx channels may be cross-arranged. Capacitance variation in an area shown in FIG. 3 along movement of a stylus pen freely will be described, with reference to FIG. 4.

Capacitance values show in the graph of FIG. 4 may be defined as X-axis and Y-axis crossing X-axis with respect to a center of Tx and Rx channels. Capacitance variation may be detected according to a position of the stylus pen. As shown in the drawing, a vertical axis may be the X-axis (a Rx-direction) and a horizontal axis may be the Y-axis (a Tx-direction). In one experiment, a coordinate of the Y-axis may be zero and only a coordinate of X-axis may be varied.

"ΔCm" refers to a variation of mutual capacitance between Tx and Rx channels according to presence of the stylus pen. Csx refers to distribution of the capacitance between the stylus pen and Tx channel. It may be shown that ΔCm may be relatively larger than Csx in an entire area and that Csx may be varied at a large degree as a value of X-axis may be closer to zero. The value of X-axis may be lessened at zero out of ΔCm values, compared with neighboring areas. Accordingly, in an aspect of sensitivity and position detecting ability, an embodiment may use Csx, rather than ΔCm, as data for detecting touch implemented by the stylus pen.

As a result, in the input system according to an embodiment, the position of the stylus pen may be detected and a method for detecting more sensitive Csx may be used.

Figure 5A:
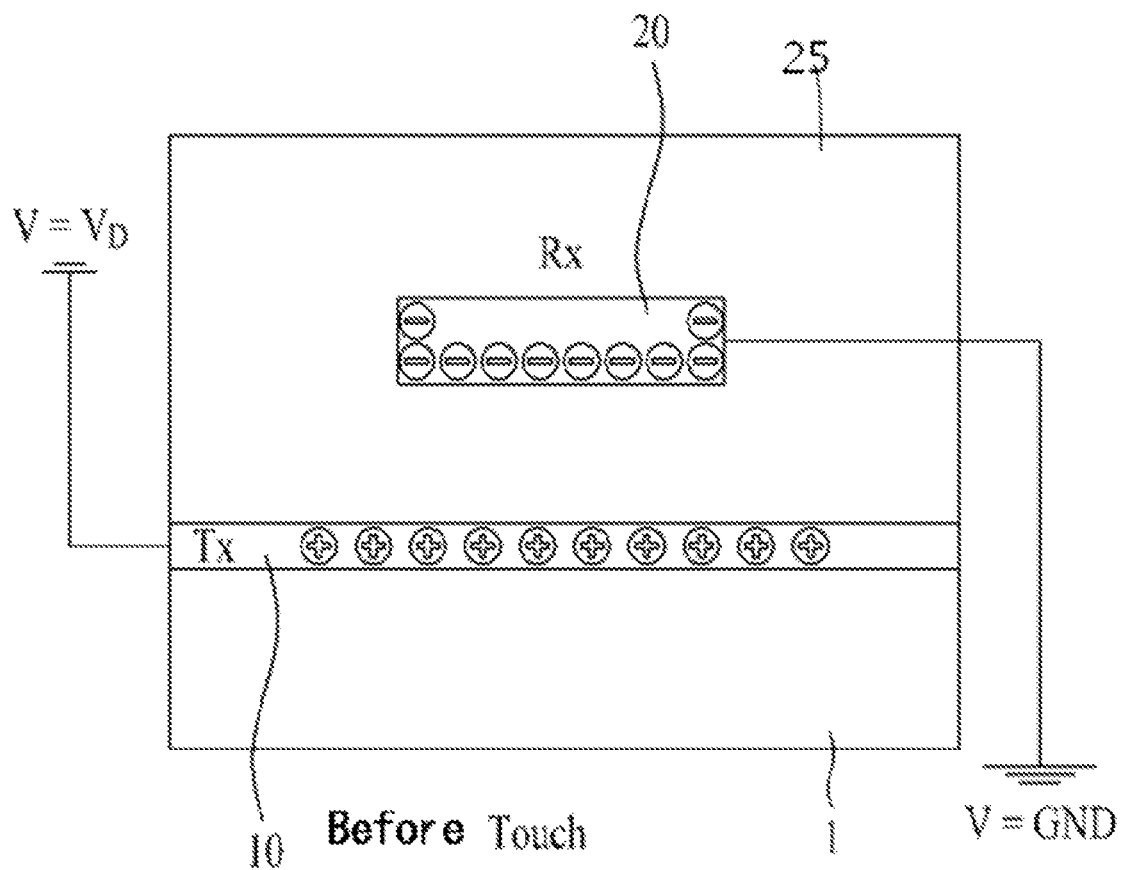
FIGS. 5A to 5C are diagrams illustrating variation of the quantity of electric charge in a prior touch state, in a finger touch state and in a stylus pen touch, when capacitance-type Tx channel and Rx channel are provided in an active region.
Figure 5B:
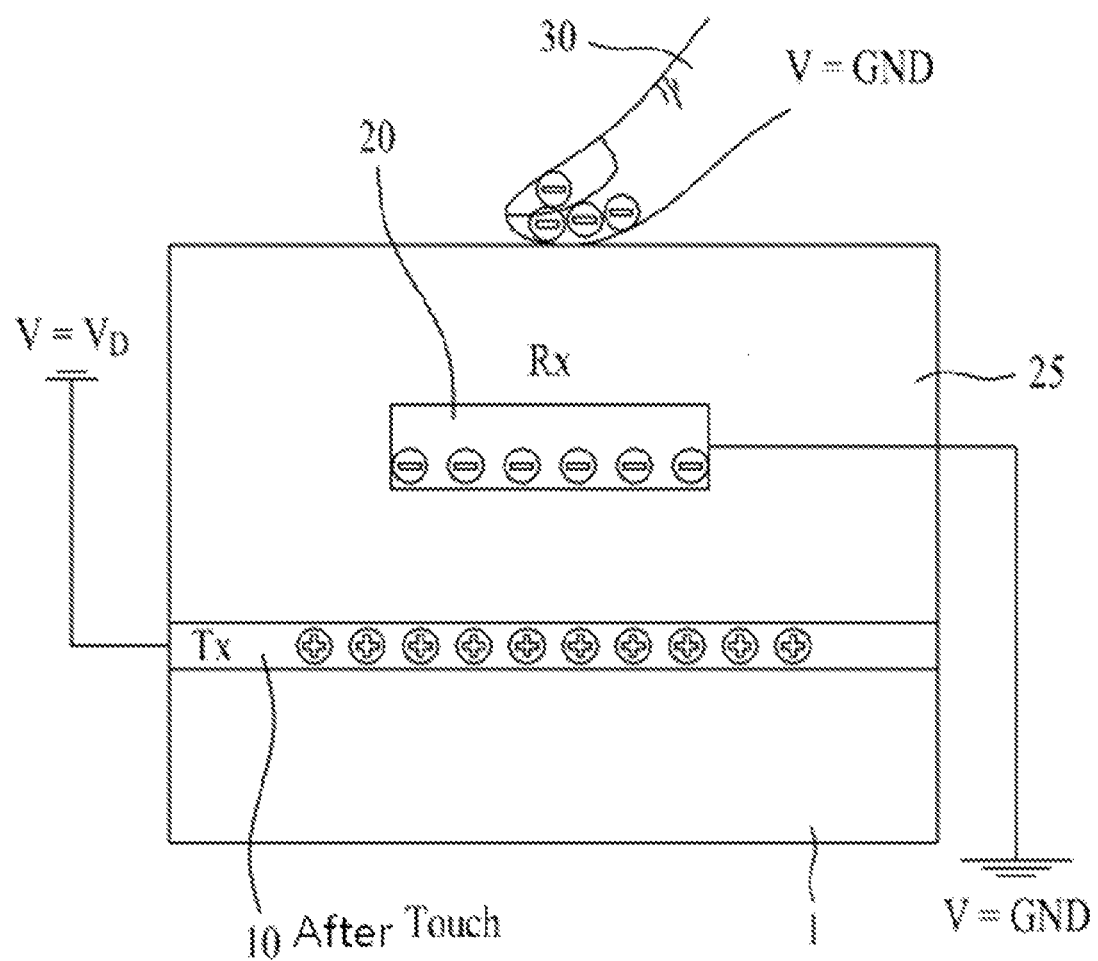
Figure 5C:
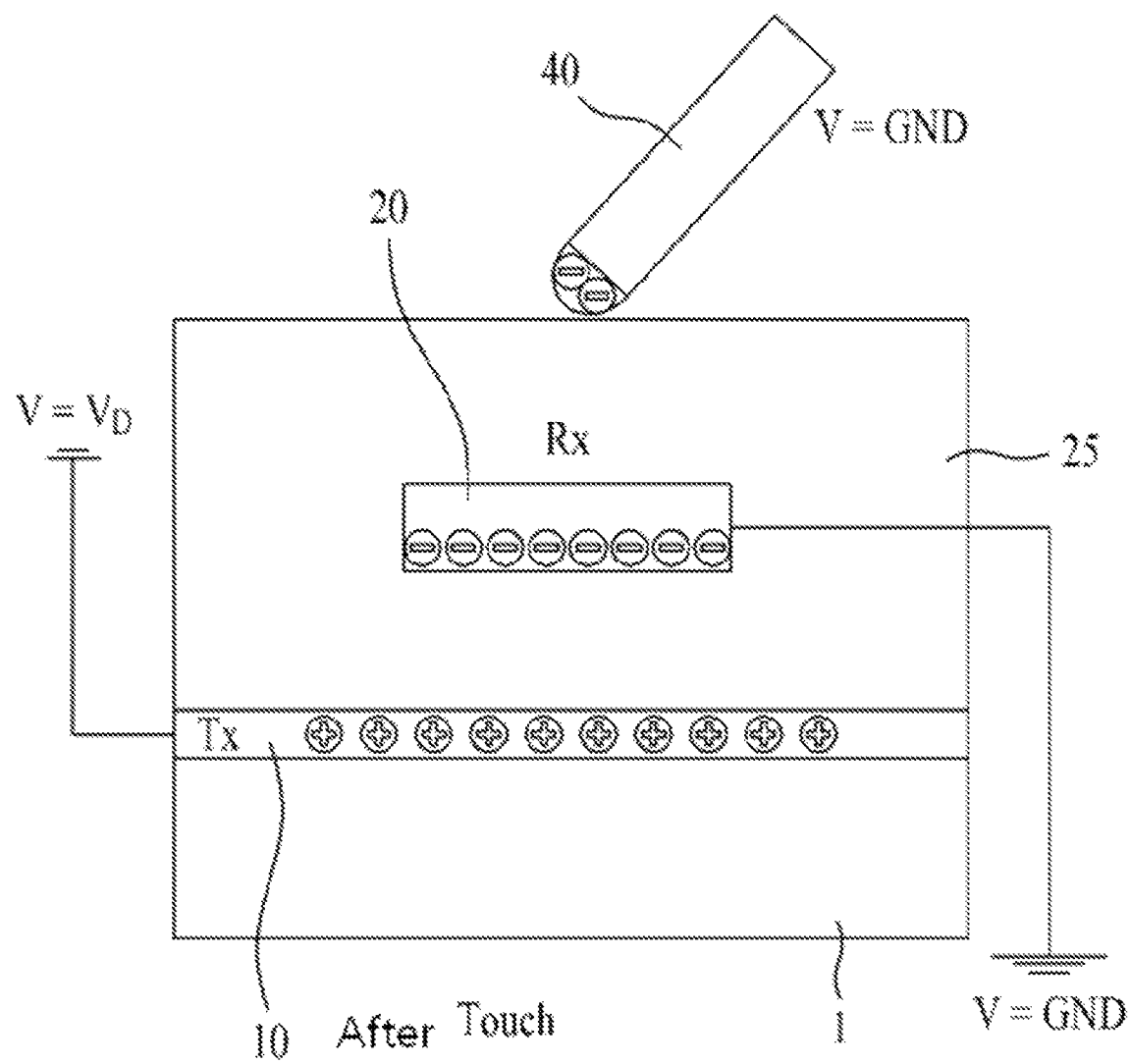

FIGS. 5A to 5C are diagrams illustrating variation of the quantity of electric charge in a prior touch state, in a finger touch state, and in a stylus pen touch state, when a capacitance-type Tx channel and Rx channel may be provided in an active region.

Commonly, the drawings show a sectional view of the crossing structure of Tx and RX channels 10 and 20 on a substrate 1. An insulator 25 may be disposed on an interlayer between Tx and RX channels 10 and 20 and on Rx channel 20 and adjacent to RX channel 20. As shown in the drawings, the insulator 25 may be formed or omitted or it may be an air gap provided when the substrate 1 may be arranged on a display.

As shown in FIG. 5A, when no touch is implemented, an electric charge (Q=Cm×Vd) in proportion to a mutual capacitance Cm between Tx and Rx channels may be transferred.

As shown in FIG. 5B, when finger touch is implemented, a predetermined amount of the electric charge transferred to Rx channel may be transferred by the finger and the quantity of the electric charge transferred to Rx channel may be decreased. That is, the mutual capacitance between Tx and Rx may be reduced from Cm to Cm' and the electric charge Q'=Cm'×Vd may be decreased. The variation of mutual capacitance ΔCm may be defined as ΔCm=Cm−Cm' which can be used as an indicator referring to the touch sensitivity.

As shown in FIG. 5C, even when the touch implemented by the stylus pen is detected by the capacitance type detecting method (the driving voltage Vd may be applied to each Tx channel and the quantity of the electric charge abandoned to Rx channel may be detected), the area of the tip in direct contact with the sensor panel and the stylus pen and the touch sensitivity (ΔCm) may be smaller in the stylus pen touch than in the finger touch. Accordingly, the accuracy of the coordinate extraction may be deteriorated.

In other words, the capacitance type detecting method using the passive pen as conductive input means, with no internal device, may have problems because of the top of the stylus pen having smaller contact area than the finger. Such problems include the deterioration of the coordination extraction accuracy, the deterioration of the touch sensitivity and the like.

As such, the passive stylus pen has problems, because the tip size of the passive stylus pen may be relatively small. Such problems include the deterioration of the coordinate extraction accuracy, the palm rejection generated when the finger touch and the stylus input may be realized by the same capacitance method, and the like. In addition, the Tx and Rx channels forms capacitive coupling with the display driving signal, only to cause a problem of display noise influence on the touch sensing signal. The passive stylus pen cannot transmit an auxiliary signal to a sensor and it has a problem of difficulty in realizing writing pressure detecting or a especial button function.

The input system according to an embodiment may use the capacitance type structure possessed by the sensor panel for the finger touch. To detect the stylus pen touch, the stylus pen may be realized in an active type with no battery. An input system including an antenna loop provided in an outer portion of a sensor panel to be driven by synchronization with a stylus pen and a method for detecting using the same will be described as follows.

Figure 6:
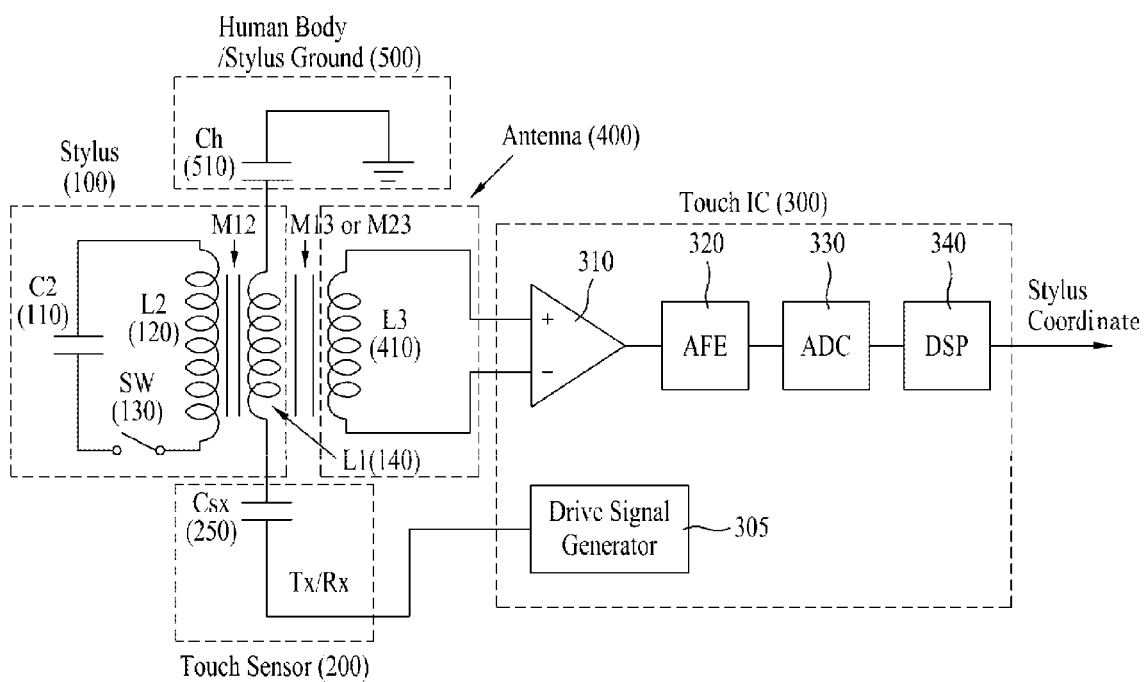
FIG. 6 is a circuit diagram of the input system according to an embodiment.
Figure 7A:
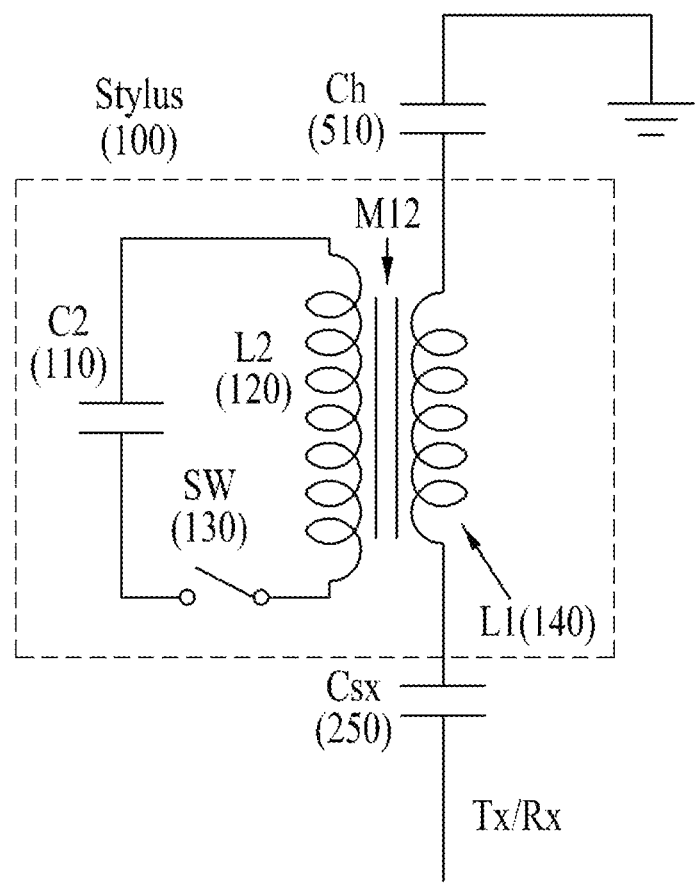
FIG. 7A is a circuit diagram illustrating an area corresponding to the stylus pen of FIG. 6.

FIG. 6 is a circuit diagram of the input system according to an embodiment. FIG. 7A is a circuit diagram illustrating an area corresponding to the stylus pen of FIG. 6.

As shown in FIG. 6, the input system according to an embodiment may be provided with a stylus pen 100, a sensor panel including a touch sensor 200 and an antenna 400, a touch controller 300, and a stylus ground 500.

The touch sensor 200 may include a plurality of first channels (Tx) and second channels (Rx) crossing each other. The touch sensor 200 may be positioned in an active region corresponding to a center of the sensor panel (see reference 201 of the FIG. 10 example). The antenna 400 may surround an outer portion of the active region provided in the sensor panel. An antenna loop 410 having both ends spaced apart from each other may be formed.

The stylus pen 200 may be provided with a first coil (L1) 140 and a second coil (L2) 120 separated from each other, a resonance capacitor (C2) 110 and a switch (SW) 130 that may be serially connected to the second coil 120, and a conductive tip 101 (see FIG. 7B) connected to the first coil 140.

The antenna loop 400 may function as a third coil (L3) 410 when it contacts with a sensor panel of the stylus pen 200. Meanwhile, the stylus pen 100 may be connected to the stylus ground 500 to stabilize an inner circuit of the stylus pen. The antenna loop 410 formed in the outer portion of the sensor panel and the first and second channels (Tx and Rx) may be connected to the touch controller 500, to be controlled by the touch controller 500.

Moreover, when the stylus pen 100 touches a face of the sensor panel (see reference 201 of the FIG. 10 example), the antenna loop 410 may receive an inductance signal resonant in the second coil (L2) 120 provided in the stylus pen 100 by inducing mutual inductance (M23) between the antenna loop 410 and the second coil (L2) 120 or mutual inductance (M13) between the antenna loop (L3) 410 and the first coil (L1) 140.

In one example, the antenna loop 410 may be formed to surround the outer portion of the sensor panel and pads may be provided in both ends of the antenna loop, respectively, to connect the antenna loop 410 to the touch controller 300.

Moreover, the touch controller 300 may be provided with an amplifier 310 connected to the antenna loop to amplify a difference of voltages received by the ends of the antenna loop 410, a filter unit (AFE) 320 connected to the amplifier 310 to filter noise, a converter (ADC) 330 connected to the filter unit 320 to convert an analog signal into a digital signal, a signal processor 340 connected to the converter to extract a coordinate by collecting the digital signal, and a drive signal generator 305 configured to generate a signal applied to each of the channels provided in the sensor.

When the stylus pen 100 touches the sensor panel 200, the switch (SW) 130 provided in the stylus pen 100 may be closed and the second coil (L2) 120 and the resonance capacitor (C2) 110 may form a closed resonance circuit.

The signal applied to each of the channels by the drive signal generator 305 may apply a square wave or sine wave at the same frequency as the resonance frequency ($f=1/[2\pi*(L2*C2)^{0.5}]$) in the closed circuit. The signal applied to each of the channels may be a kind of an AC voltage and it has a signal shape having a wave form similar to the applied signal or a signal shape having a wave form getting larger according to the time.

Meanwhile, the stylus ground 500 may be a wire connected between the stylus pen 100 and the user or between the stylus pen 100 and the sensor panel 201. The capacitance "Ch" 510 indicates that the user may function as a dielectric substance when the stylus pen 100 is in contact with the user and a state where the capacitance quantity of the stylus ground may be generated between the stylus pen 100 and the ground terminal.

Each first coil (L1) 140 and each second coil (L2) 120 provided in the stylus pen may be coupled as a first mutual inductance (M12) via a magnetic core (see reference 135 of the FIG. 7B example) passing an inner axis of the stylus pen 100.

Meanwhile, the second coil (L2) 120 and the resonance capacitor (C2) 110 may be configured to have a value fitted to generate electromagnetic resonance and a frequency of a signal input via the sensing capacitor (Csx) 250 capacitance-coupled by the touch sensor 200 having the first and second channel (Tx/Rx) crossing each other in the sensor panel. The resonance frequency has a condition of $f=1/[2\pi*(L2*C2)^{0.5}]$). The sensing capacitor (Csx) 250 may be not a device having a physical circuit configuration, but rather a virtual device capacitance-coupled and generated at a contact position between a conductive tip of the stylus pen 100 and the sensor panel 201.

Moreover, the magnetic signal generated in the electromagnetic resonance generated in the stylus pen 100 may generate an induced electromotive force between the first coil (L1) 140 or the second coil (L2) 120 and the third coil (L3) 410 corresponding to the antenna coil formed by a second inductance (M13 or M23) with the antenna loop (L3) 410 formed in the sensor panel 201. Such an induced electromotive force may be amplified by the amplifier 310 configured to amplify a voltage difference between both ends of the antenna loop 410. The amplified induced electromotive force may pass the filter unit (Analog Front End; "AFE") 320 provided with a filter, and so on, to filter noise and it may be converted into a digital signal by the converter (Analog to Digital Converter; "ADC") 330 after that. The converted digital signal may have a coordinate extracted based on a fitted algorithm by the signal processor (Digital Signal Processor; "DSP") 340 and data associated with the extracted coordinate, and the like, may be transmitted to a host system.

Meanwhile, an end of the first coil (L1) 140 provided in the stylus pen 100 may be connected to the top of the stylus tip and the other end thereof may be connected and grounded to a conductive body (see reference 150 of the FIG. 7B example) of the stylus pen. The conductive body may be formed of a conductive material. Optionally, the other end of the first coil may be connected to the stylus ground capacitor (Ch 510) corresponding to a human body when the user may be configured of the ground 500.

Figure 7B:
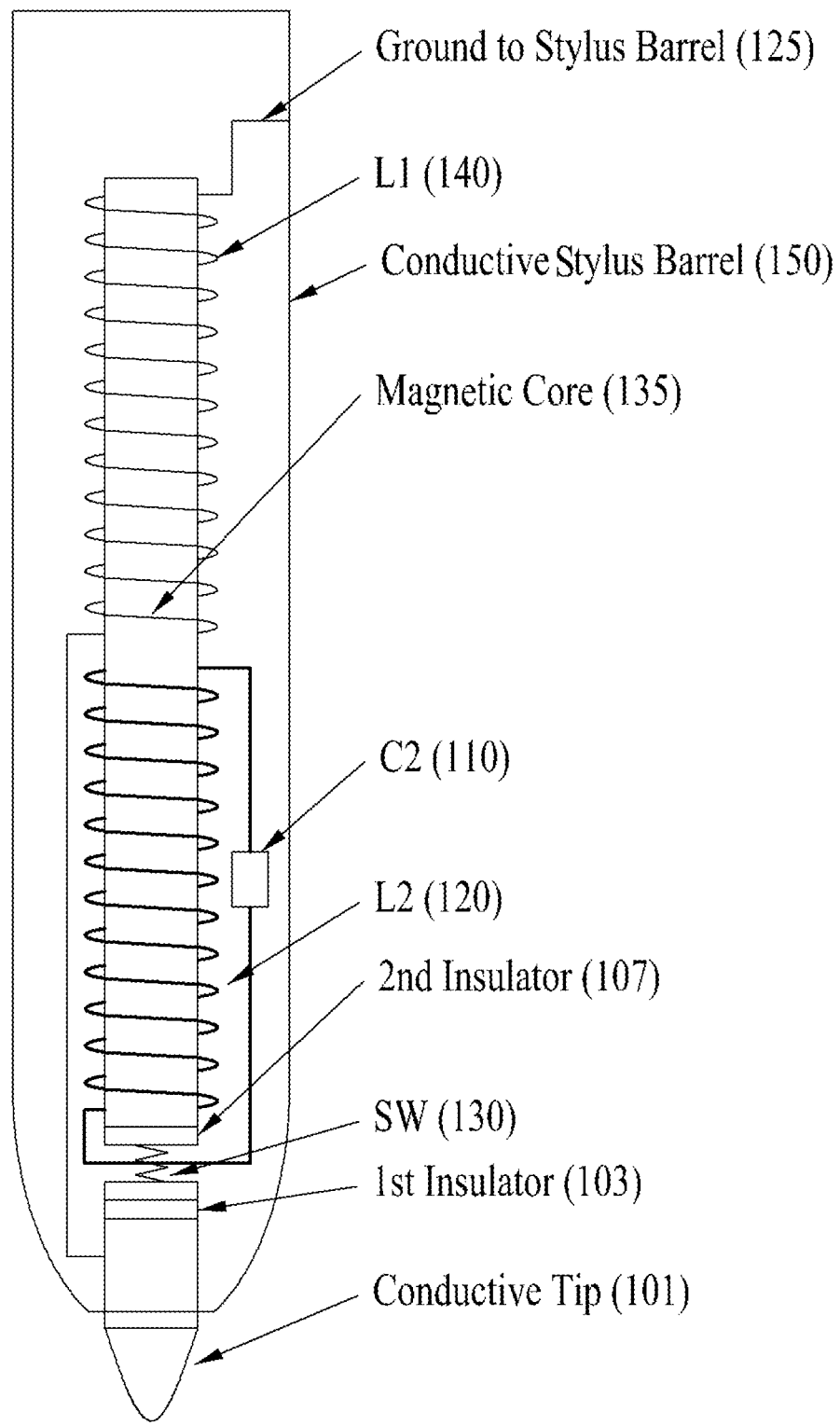
FIG. 7B is a diagram structurally illustrating the stylus pen of FIG. 6 according to an embodiment.

FIG. 7B is a diagram structurally illustrating the stylus pen of FIG. 6 according to an embodiment.

As shown in FIG. 7B, the stylus pen 100 according to an embodiment may be provided with a first coil (L1) 140 and a second coil (L2) 120 alternatively wound around a magnetic core 135.

The first coil (L1) 140 and the second coil (L2) 120 may be wound around the magnetic core 135 positioned in an axial direction of the stylus pen 100. In one example, the axial direction may be a longitudinal direction of the stylus pen, corresponding to Z-axis in an X-Y-Z coordinate system.

The conductive stylus barrel 150 of the stylus pen 100 may include the first coil (L1) 140, the second coil (L2) 120, a resonance capacitor (C2) 110, and the magnetic core 135. Moreover, the conductive stylus barrel 150 may have a hole to enable the conductive tip 101 partially projected there through.

The conductive tip 101 may be insulated from the conductive stylus barrel 150. For that insulation, an insulative suspension unit (not shown) may be further provided around the hole to surround the conductive tip 101.

In one example, the conductive stylus barrel 150 may be connected to the stylus ground 500 mentioned above.

The switch (SW) 130 may be formed of a spring or elastic rubber. To maintain the insulation with respect to the conductive tip 101, the switch (SW) 130 may include a first insulation film. The first insulation film may be disposed between the conductive tip 101 and the switch (SW). Also, the switch 130 may operated by pressure applied when the conductive tip 101 presses the sensor panel. In other words, when the conductive tip 101 presses the sensor panel with a predetermined pressure or more, the switch 130 may be closed to make the resonance circuit form a closed circuit.

The switch (SW) 130 may be connected to the second coil (L2) 120, and a second insulation film 107 may be disposed between the switch (SW) 130 and the magnetic core 135 to insulate the switch (SW) 130 from the magnetic core 135.

An end of the first coil (L1) 140 may be connected to the conductive tip 101, and the other end thereof may be connected to a ground to a stylus barrel 125 of the conductive stylus barrel 150.

The operation of the stylus pen will be described as follows.

The touch detecting may be enabled by the capacitive coupling between the sensor panel 201 and the conductive tip 101 which may be electrically connected to the first coil L1 (140). When the switch 130 is closed, the resonance capacitor 110 and the second coil L2 (120) may form a resonance circuit, and this resonant circuit may be driven by the first coil L1 through the magnetic coupling (mutual inductance) between the first coil L1 and the second coil L2. The electromagnetic resonance generated in the second coil may transmit an electromagnetic field (signal) which is proportional to the strength of the resonance to the antenna loop 410 (third coil L3), where electromotive force is induced by the transmitted electromagnetic field (signal). In other words, the electromagnetic resonance in the second coil L2 may induce electromotive force in the antenna loop 410 via magnetic coupling (e.g., mutual inductance) between the second coil L2 and the antenna loop 410.

As an example, the end of the first coil (L1) 140 may be capacitively coupled to a touch sensor (see reference 200 of the FIG. 6 example) of the sensor panel, to form the sensing capacitor (Csx) 250.

Accordingly, the input signal from each channel of the touch sensor may drive the first coil (L1) 140 via Csx and may drive the resonance circuit provided with the second coil (L2) 120 and the resonance capacitor (C2) 110 via the first mutual inductance (M12) to be magnetically coupled.

The circuit may be configured to make the frequency of the signal input from the drive signal generator 305 to each channel (Tx/Rx) of the touch sensor 200 identical to the electromagnetic resonance frequency configured of the second coil (L2) 120 and the resonance capacitor (C2) 110. In one example, the signal intensity may be increased by the electromagnetic resonance over time. When this occurs, the other end of the first coil (L1) 140 may be grounded via the ground capacitor (Ch 510) configured of the human finger or body contacting with the conductive stylus barrel 150 of the stylus pen.

The switch (SW) 130 may be closed when the conductive tip 101 is pressured to the face of the sensor panel. When the switch 130 is closed, the electromagnetic resonance may be generated to enable the input sensing of the stylus pen. In other words, unless the stylus pen is pressed, the stylus pen may be not driven to prevent errors. Even when the stylus pen is close, but not touching, the sensor panel, it is not driven. The magnetic signal generated in the electromagnetic resonance may be transmitted to the antenna loop 410 positioned in the outer portion of the sensor panel and it may function as a kind of a third coil (L3) 410. A voltage difference between both ends of the antenna loop 410 may be sensed by the touch controller 300.

When the stylus pen 100 touches the sensor panel face (see reference 201 of the FIG. 10 example), the generation of the sensing capacitor (Csx) 250 and the ground via the body of the stylus pen may be implemented. At this time, the signal applied to the sensing capacitor (Csx) 250 via the conductive tip provided in the stylus pen 100 may be transmitted to the first coil (L1).

Hence, the signal transmitted to the first coil (L1) may be transmitted to the second coil (L2) by the first inductance (M12). When the switch (SW) is closed, the second coil (L2) and the resonance capacitor (X2) may form the closed circuit to be resonant. The signal intensity of the second coil (L2) may increase over time. At this time, the first mutual inductance (M12) could make the first coil (L1) adjacent to the second coil (L2) affected by the second coil (L2) having the increased intensity.

The magnetic signal of the second coil (L2) provided in the resonance circuit may be induced to the antenna loop by the second inductance (M23 or M12). As such, the sensing of the antenna loop may be performed for each of the channels.

Figure 8:
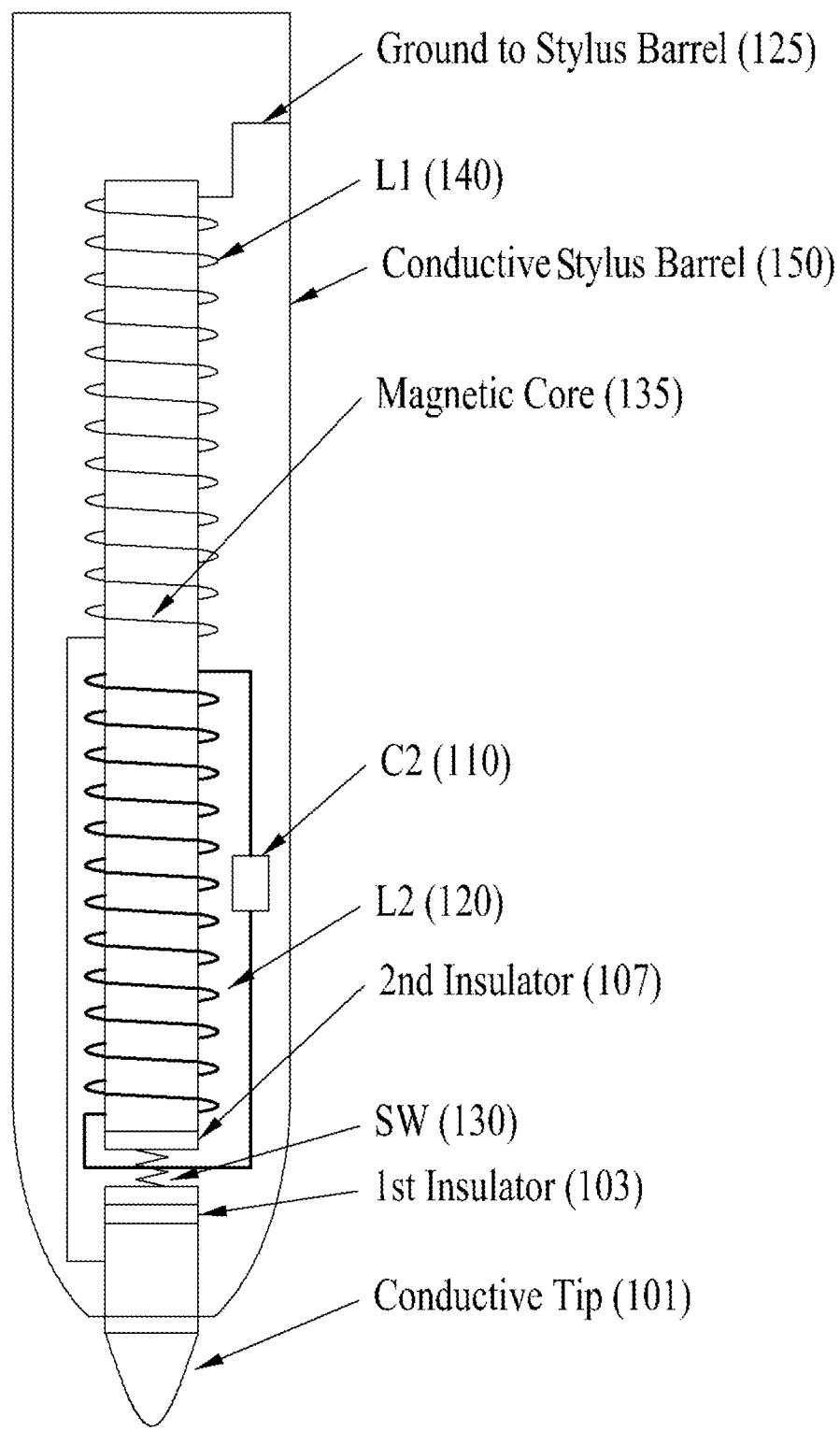
FIG. 8 is a diagram structurally illustrating the stylus pen of FIG. 6 according to an embodiment.

FIG. 8 is a diagram structurally illustrating the stylus pen of FIG. 6 according to an embodiment. As shown in FIG. 8, the first coil (L1) 140 and the second coil (L2) 120 may be not alternatively wound but may be wound in a different region. The other configurations may be identical to the above and the description of the same configuration will be omitted accordingly.

In the FIG. 8 example, there may be an advantage of reduced parasitic capacitive capacitance between the first coil and the second coil, with no interference. Optionally, the FIG. 7B structure may be selected when the parasitic capacitive capacitance may be negligible. The structure of FIG. 8 may be selected when the accuracy of the touch sensitivity may be degraded by the parasitic capacitive capacitance.

Figure 9A:
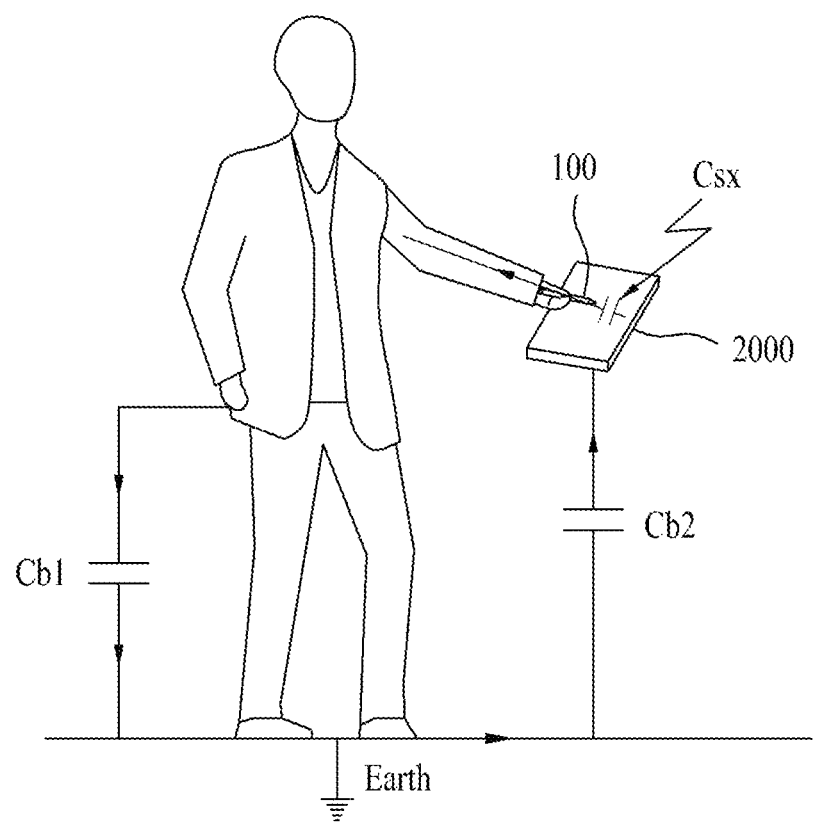
FIGS. 9A and 9B are diagrams illustrating different embodiments of a bonding method in the input system according to an embodiment.
Figure 9B:
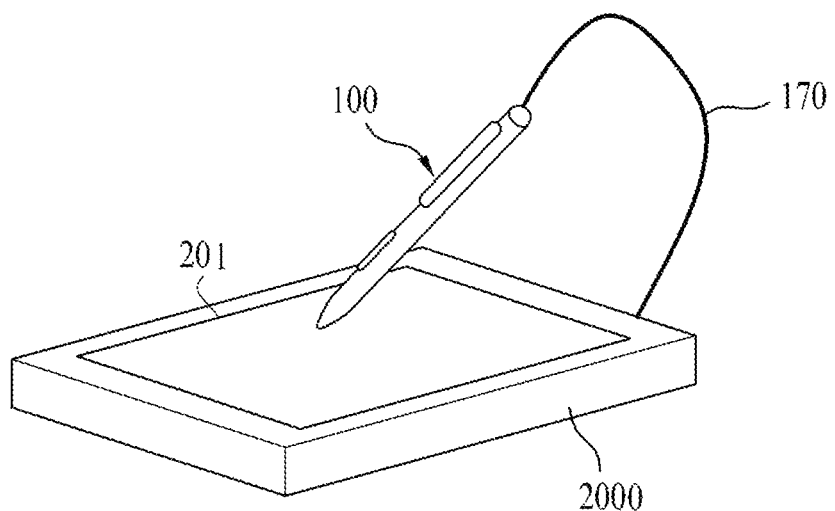

FIGS. 9A and 9B are diagrams illustrating a ground method of the input system according to embodiments.

FIG. 9A shows grounding enabled by the conductive stylus barrel 150 of the stylus pen 100 and a human body as mentioned above. As illustrated in FIG. 9A, in an example of the ground enabled by the human (the user), a display device 2000 having a sensor panel 201 mounted therein and a human body may be coupled via capacitance of Cb1 and Cb2. If the user holds the display device 2000 with his or her hand, Cb2 may be coupled more strongly via the other hand or body. Accordingly, a closed circuit may be formed to transmit an AC signal.

Meanwhile, the display device 2000 may be a display panel to which the sensor panel 201 may be mounted. Examples of such a display panel may include a liquid crystal display panel, an organic light-emitting display panel, a plasma display panel, a quantum dot display panel, an electrophoretic display panel, and the like. Such a panel may include a light source, and the panel may further include an auxiliary case unit when it includes the light source.

The sensor panel 201 may be disposed on the display device 2000 or may be formed on a panel face of the display device 2000 in an array process. Optionally, the sensor panel 201 may be formed in the panel.

Even when a wireless stylus pen is realized, the configuration shown in FIG. 9A may realize the ground implemented by the human body.

FIG. 9B shows a wired stylus pen directly connected to a touch controller of the display device 2000 having the sensor panel 201 via a wire 170 to enable the ground of the stylus pen. In this example, the stylus pen 100 and the sensor panel 210 may be physically connected to each other via the wire 170.

Figure 10:
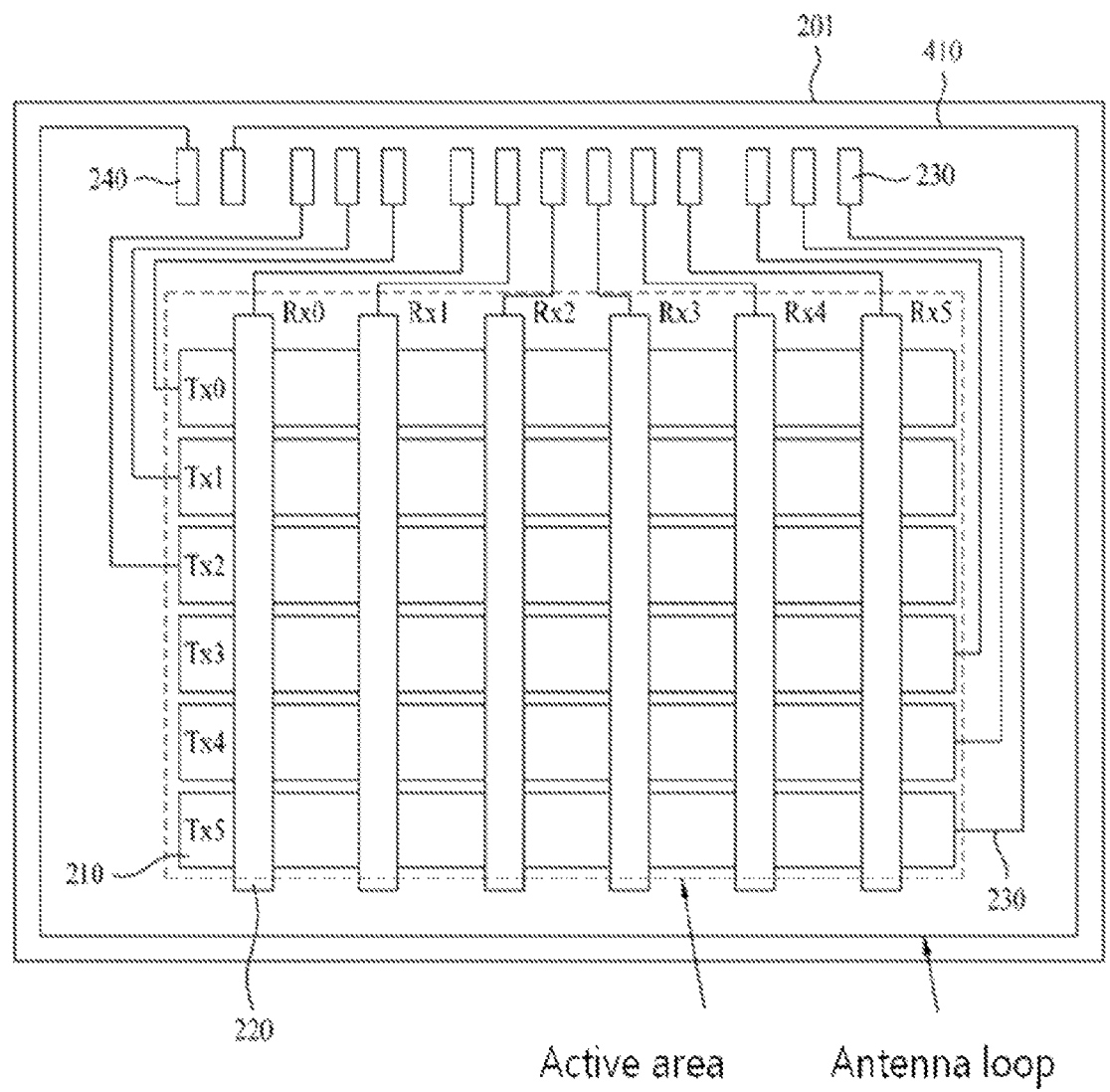
FIG. 10 is a plane view illustrating a touch sensor panel of the input system according to an embodiment.

FIG. 10 is a plane diagram of the touch sensor panel provided in the input system according to an embodiment.

As shown in FIG. 10, the sensor panel 201 of the input system according to an embodiment may include an active region and an outer region. The plurality of the first and second channels (Tx/Rx) 210 and 220 may be formed in a bar shape. The first channel (Tx) and the second channel crossing each other may be arranged on the active region. Optionally, the bar-shape of the channel shown in the drawing can be varied into another pattern of the capacitance type. For instance, the shape of the channel may be a diamond pattern or a polygonal pattern. In some examples, the input system according to an embodiment may have a symmetrical shape in all directions with respect to a center for the accuracy of the stylus pen. These examples are intended to be nonlimiting.

An antenna loop may be formed in the outer region of the sensor panel 201 to receive an electromagnetic signal generated from the resonance circuit formed in the stylus pen 100. The antenna loop 410 may be formed larger than the active touch region where the stylus input may be substantially enabled and where coordinate extraction may be performed. That may solve an edge effect that accuracy of coordinate extraction may be deteriorated by non-symmetry of the channels in an edge area of the sensor panel 201 when detecting touch using the stylus pen 100.

Meanwhile, the antenna loop 410 may be a kind of a third coil of which EMF (electromotive force) can be induced and it may include no auxiliary magnetic core having a physical shape. In this instance, the antenna loop 410 may be a coil that may be operable via an air core between the stylus pen and the antenna loop.

It may be preferred that each of the first and second channels (Tx and Rx) 210 and 220 may be formed of a transparent electrode to transmit light in the display device. The first channel (Tx) 210 of a finger touch period may be configured to apply a drive signal. The second channel (Rx) 220 may be used in receiving a detect signal. The first and second channels (Tx and Rx) 210 and 220 may be electrically connected to each other via a pad 230 and a routing wire 225 provided in an edge area of each sensor panel 201.

A loop pad 240 formed in parallel with the pad 230 provided in the edge area of the sensor panel 201 may be formed in each end of the antenna loop 410. A voltage difference between the loop pads 240 may be detected by the touch controller.

Meanwhile, the antenna loop 410 and the routing wire 225 may be formed together in a single process. Or, to improve an electromagnetic induction characteristic of the antenna loop 410, a planar magnetic core sheet-shaped to contact with the antenna loop 410 may be further provided in the sensor panel 100.

Figure 11:
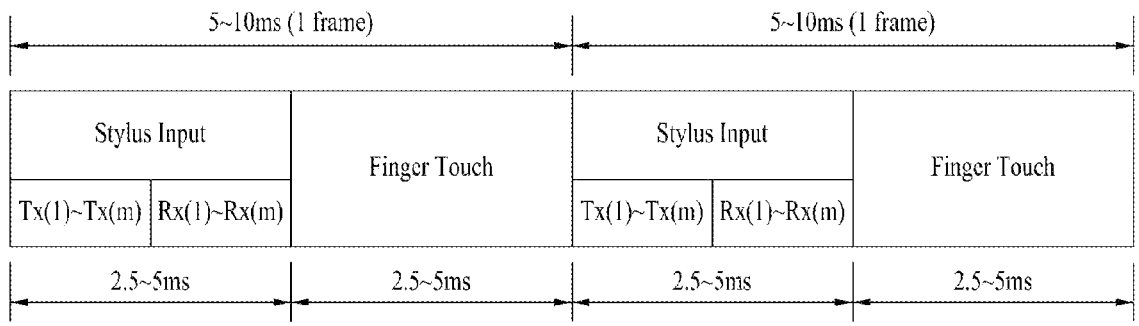
FIG. 11 is a diagram illustrating a frame driving module of the input system according to an embodiment.

FIG. 11 is a diagram illustrating a method of driving a frame provided in the input system according to an embodiment.

As shown in FIG. 11, the input system according to an embodiment may drive a first frame according to time division for stylus touch detecting and for finger touch detecting. A frame period for the stylus touch detecting and a frame period for the finger touch detecting may be alternated.

For instance, when a first frame period is 5-10 ms, the frame rate may be 100-200 Hz. The frame rate may be calculated by dividing the first frame period into the stylus touch detecting frame period for the stylus touch detecting and the finger touch detecting frame period for the finger touch detecting. Optionally, the time for the stylus touch detecting or the finger touch detecting can be adjusted longer in the first frame.

Meanwhile, when detecting the stylus touch, the number of the first channels (Tx) and the number of the second channels (Rx) may be m and n, respectively, as shown in FIG. 10, the m channels Tx(1)-Tx(m) of the first channels and the n channels Rx(1)-Rx(n) of the second channels may be sequentially driven and sensed.

In other words, "m+n" channels may be sequentially driven in the frame period for the stylus touch detecting. Accordingly, for instance, if "m+n" may be 50 (m+n=50), the time taken to drive a single channel may be 50-100 μs, given by dividing 2.5 ms to 5 ms by 50.

In the finger touch detecting, the drive signal may be applied to the first channels (Tx) sequentially and the detect signal may be sensed from the second channels (Rx). Variation generated by touch may be detected and the touch position may be detected. Relatively, in the finger touch detecting, the drive signal may be applied only to the first channels (Tx). Accordingly, the time (2.5 ms to 5 ms/m) taken to apply the drive signal to each of the first channels (Tx) in the finger touch detecting may be longer than the time (2.5 ms to 5 ms/(m+n)) taken to apply the signal to each of the channels in the stylus touch detecting.

In one example, the signal waveform for driving each of the channels and sensing waveform may be alternatively driven by dividing the stylus input and the finger touch with time.

A method for driving and sensing the channels in the stylus pen touch detecting will be described.

Figure 12A:
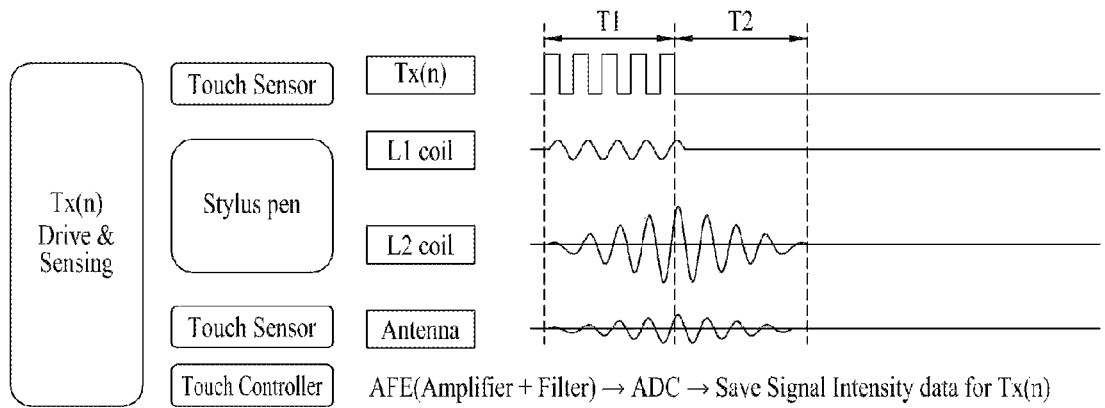
FIGS. 12A and 12B are spectrograms of detected wave form for each component of the touch sensor panel and the stylus pen in a touch detecting method using the input system according to an embodiment.
Figure 12B:
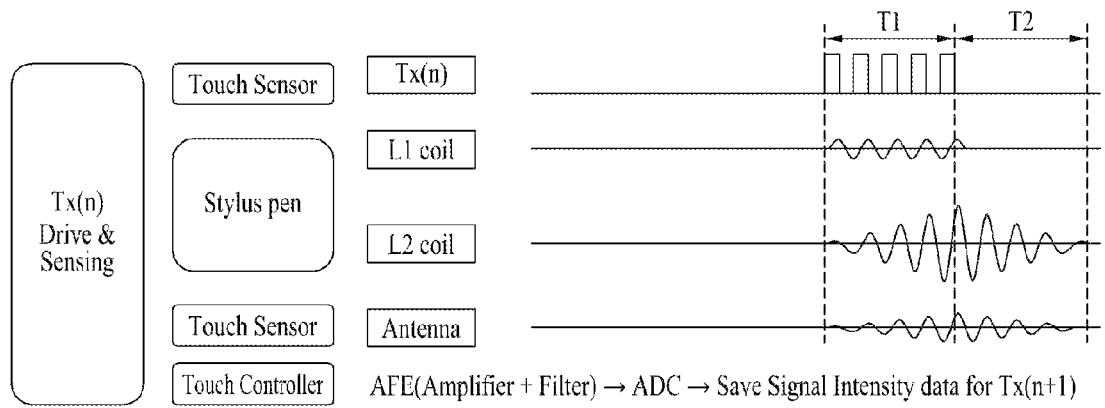

FIGS. 12A and 12B are spectrograms of detected wave form for each component of the touch sensor panel and the stylus pen in a touch detecting method using the input system according to an embodiment.

As shown in FIGS. 12A and 12B, the process of driving and sensing two of the first channels Tx(n) and Tx(n+1) in the input system according to an embodiment will be described.

The drawings show the driving process of the channels Tx(n) and Tx(n+1). In such a process, signals may be applied to Tx(1)-Tx(m) and Rx(1)-Rx(n) sequentially and the touch detecting may be performed based on the difference between the voltages received by both ends of the antenna loop 410 for each channel.

For the touch detecting, the sensing capacitor (Csx) provided between the conductive tip (see reference 101 of the FIG. 7A example) and the sensor panel 210 may be electrically connected with the first coil (L1). After that, the switch (SW) may be closed to form the resonance circuit between the second coil (L2) and the resonance capacitor (C2). The electromagnetic resonant induced electromotive force may be received by the antenna loop 410 by the second mutual inductance (M23 or M13) between the second coil (L2) or the first coil (L1) and the antenna loop.

Meanwhile, the signal applied to each of the first and second channels Tx(1)-Tx(m) and Rx(1)-Rx(n) may be a square wave or sine wave at a frequency identical to the resonance frequency in the resonance circuit.

The stylus pen may be grounded to the face of the sensor panel by the user touching the stylus pen on the sensor panel face. In one example, the ground may be performed by the user directly contacting with the conductive body or connecting the conducive body with the sensor panel via the wire.

As shown in FIG. 12A, when driving the Tx(n) channel, the signal at a predetermined wave form or sine form may be applied to the Tx(n) channel by the touch controller for T1 time. No signal may be applied to the Tx(n) channel for the Ts time period and only the signals received by the circuit and the antenna loop may be sensed That is, when the signal, e.g., square wave or sine wave signal, is applied to the Tx(n) channel, the sensing capacitor (Csx) sensed by the capacitance coupling between the Tx channel and the conductive tip may be formed in the first coil (L1) of the stylus pen for the time Ts. When the stylus pen touches the sensor panel face, the electrical connection between the sensing capacitor (Csx) and the conductive tip may be formed and the wave form may be synchronized to the first coil to form a weak wave form. The coupling between the first coil and the second coil may be generated and the first mutual inductance (M12) may be formed, only to drive the second coil. For example, the wave form of the second coil (L2) may be getting larger as time passes within the T1 time period. Accordingly, the electromagnetic resonance may be generated via the resonance capacitor (C2) and the resonance frequency serially connected within the resonance circuit of the closed circuit, and the amplitude may increase over time.

In addition, when the stylus pen touches the sensor panel, the first coil (L1) or the second coil (L2) may be coupled by the second mutual inductance (M13 or M23) and the antenna loop within the sensor panel. Accordingly, the antenna loop may sense the electromagnetic signal generated by the resonant stylus pen.

The antenna loop may store digital data associated with the signal intensity with respect to the voltage difference between both ends of the antenna loop corresponding to the channel in steps of detecting a voltage difference received by the antenna loop, amplifying the voltage difference, filtering noise from the amplified voltage difference, converting an analog signal of the amplified voltage difference having the noise filtered there into a digital signal, and storing the digital signal in the memory.

Hence, as shown in FIG. 12B, the drive signal may be applied to Tx(n+1) channels and detecting touch by the method described above. Digital data in proportion to the size of the signal may be stored in the memory.

When the digital data associated with the signal intensity of each channel of one frame is collected through the above-mentioned process, the coordinate of the position where the stylus pen may be positioned may be extracted by the signal processor.

Meanwhile, in the signal application period of the stylus pen may be applied only at T1 as shown in the drawing to secure a sufficient touch detecting period additionally. Or, in the T1+T2 period the signal application and the touch detecting may be implemented simultaneously. Each of the above examples may have advantages and disadvantages. For example, if a signal receiving period is T1+T2, the time taken to receive the signal may get longer and the accuracy of the measured signal may not be expected to improve. However, for the T1 time, Tx or Rx channels may be driven and a parasitic loop configured of Tx and Rx channels may generate a magnetic signal and such a signal may be an element of noise to the antenna loop. Such noise could be received by the antenna loop together with the signal generated in the resonance circuit provided in the stylus pen.

Accordingly, if accurate touch detecting is difficult because of the magnetic field interference caused by the parasitic loop, the touch detecting enabled by the resonance signal detecting of the stylus pen may be performed only in the T2 period. In this example, no resonance signal may be received for T1 time and the signal receiving time and data accuracy might be deteriorated. However, the magnetic noise may not affect the antenna loop, advantageously.

Meanwhile, it may prove whether the stylus pen touch detecting may be performed in the input system via simulation.

Figure 13A:
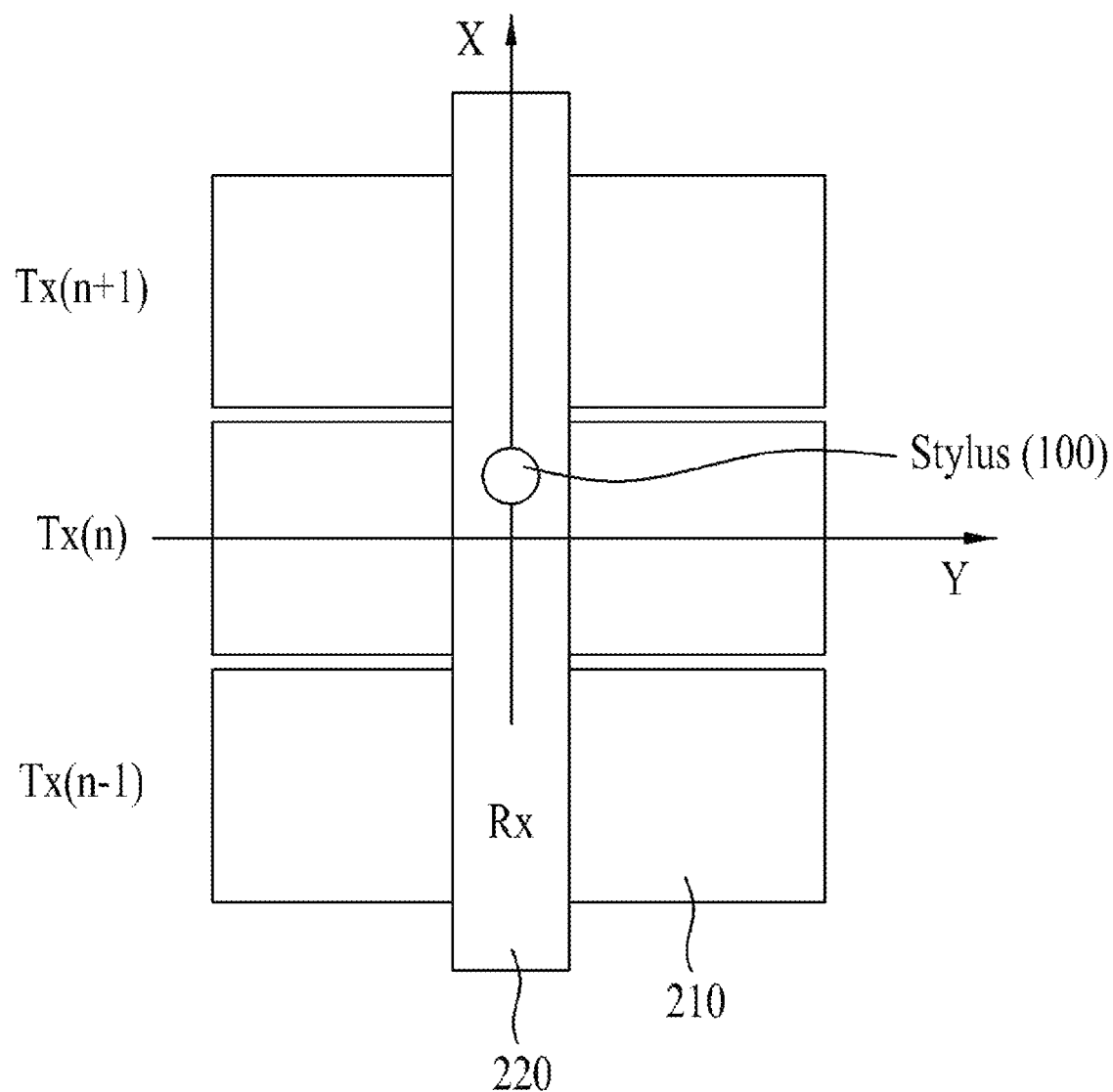
FIG. 13A is a diagram illustrating an experimental area of signal strength in the input system according to an embodiment.
Figure 13B:
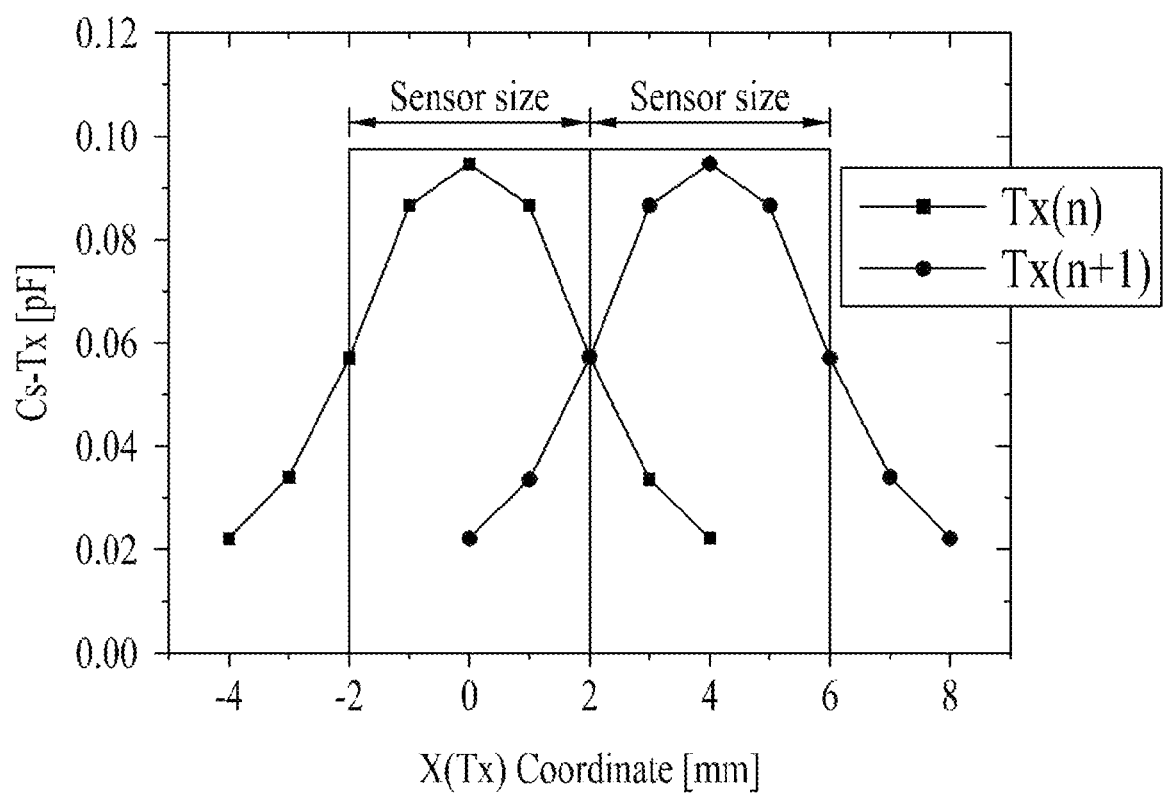
FIG. 13B is a simulation of capacitance variation Csx calculated along X-axis movement of FIG. 13A.

FIG. 13A is a diagram illustrating an experimental portion of the signal intensity in the input system. FIG. 13B is a simulation showing capacitance Csx variation generated according to movement of X-axis.

As shown in FIG. 13A, the stylus pen 100 may be positioned at 0 and only a coordinate of X-axis may be changed. In this example, it may be simulated in FIG. 13B a capacitance value (Csx) of the sensing capacitor between the conductive tip of the stylus pen and Tx(n) and Tx(n+1) channels.

It may be shown that the capacitance value (Csx) of the sensing capacitor may be the maximum at the center of Tx channel and it may decrease farther from the center.

Meanwhile, when the stylus pen 100 is positioned in the middle of the Tx(n) and Tx(n+1), a sensing capacitance value (Csx(n)) may be identical to a sensing capacitance value Csx(n+1) for Tx(n+1). In other words, Csx(n)=Csx(n+1).

If the stylus pen gets closer to Tx(n+1) than Tx(n), it may be shown that a sensing capacitance value Csx(n) coupled to Tx(n) is larger than a sensing capacitance value Csx(n+1) coupled to Tx(n+1). In other words, Csx(n)<Csx(n+1). Accordingly, the signals in proportion to such the coupled sensing capacitance values may be generated to Tx channels, respectively, and touch may be detected based on the signals, only to gain analog data associated with signal intensity used in extracting the position of the stylus pen.

Figure 14A:
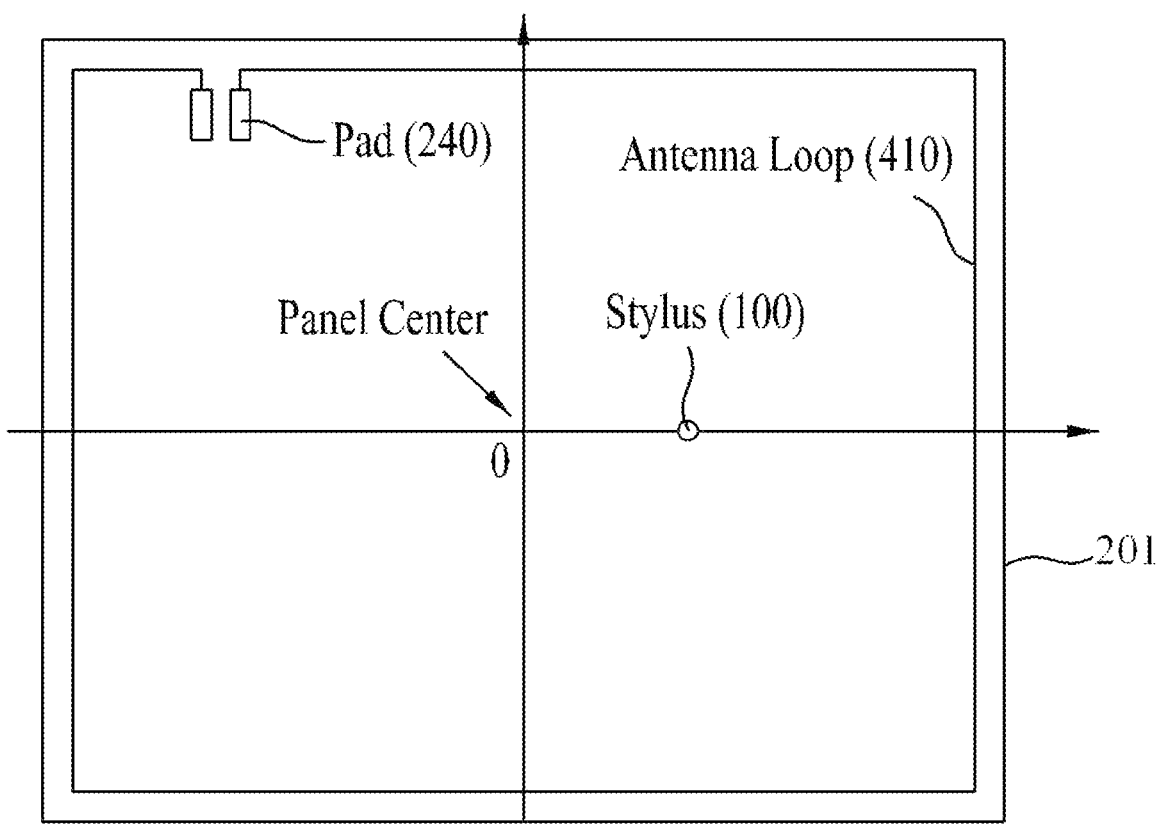
FIG. 14A is a diagram of a touch sensor panel provided in the input system and an antenna loop provided in the touch sensor panel.
Figure 14B:
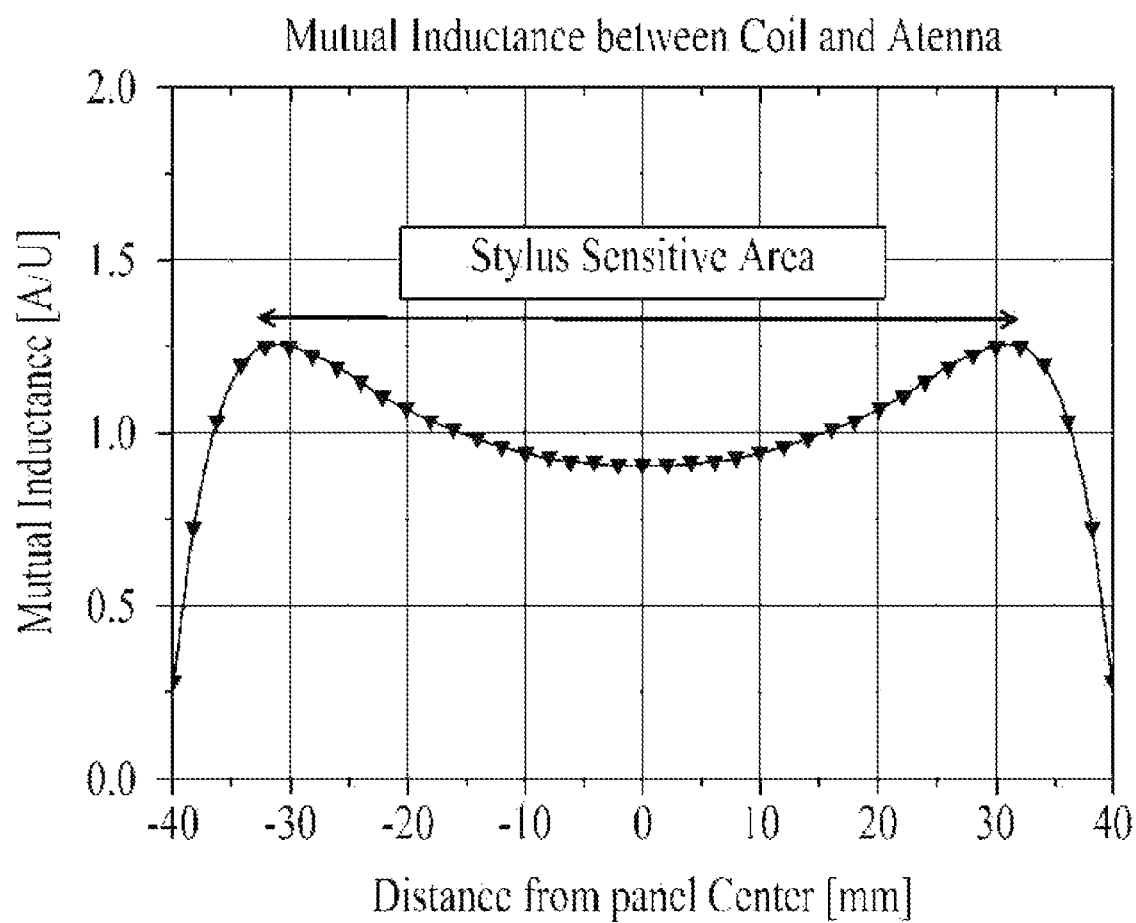
FIG. 14B is a graph of mutual inductance generated when the stylus pen moves along X-axis of FIG. 14A.

FIG. 14A is a diagram of a touch sensor panel provided in the input system and an antenna loop provided in the touch sensor panel. FIG. 14B is a graph of mutual inductance generated when the stylus pen moves along the X-axis of FIG. 14A.

As shown in FIG. 14A, the center of the sensor panel 210 may be 0 (zero) and a horizontal axis may be defined as the X-axis and a vertical axis may be defined as the Y-axis. When moving the stylus pen 100 along X-axis, the mutual inductance (M23) may be simulated as follows which may be between the second coil (L2) for generating the magnetic signal and the antenna loop 410 (L3) receiving the magnetic signal in the sensor panel 210. As shown in FIG. 14B, the mutual inductance M23 may be changed gently in a range of 0.5 A/U-1.5 A/U in a center area of the antenna loop (e.g., the active region). The mutual inductance M23 may fall suddenly near an edge area, which may be called an "edge effect." In one example, the active region where the first and second channels may be substantially arranged may be positioned in an area where the mutual inductance may increase when farther from the 0 point. In one example, the active region may be designed to be formed in an area preventing the edge effect.

Figure 15A:
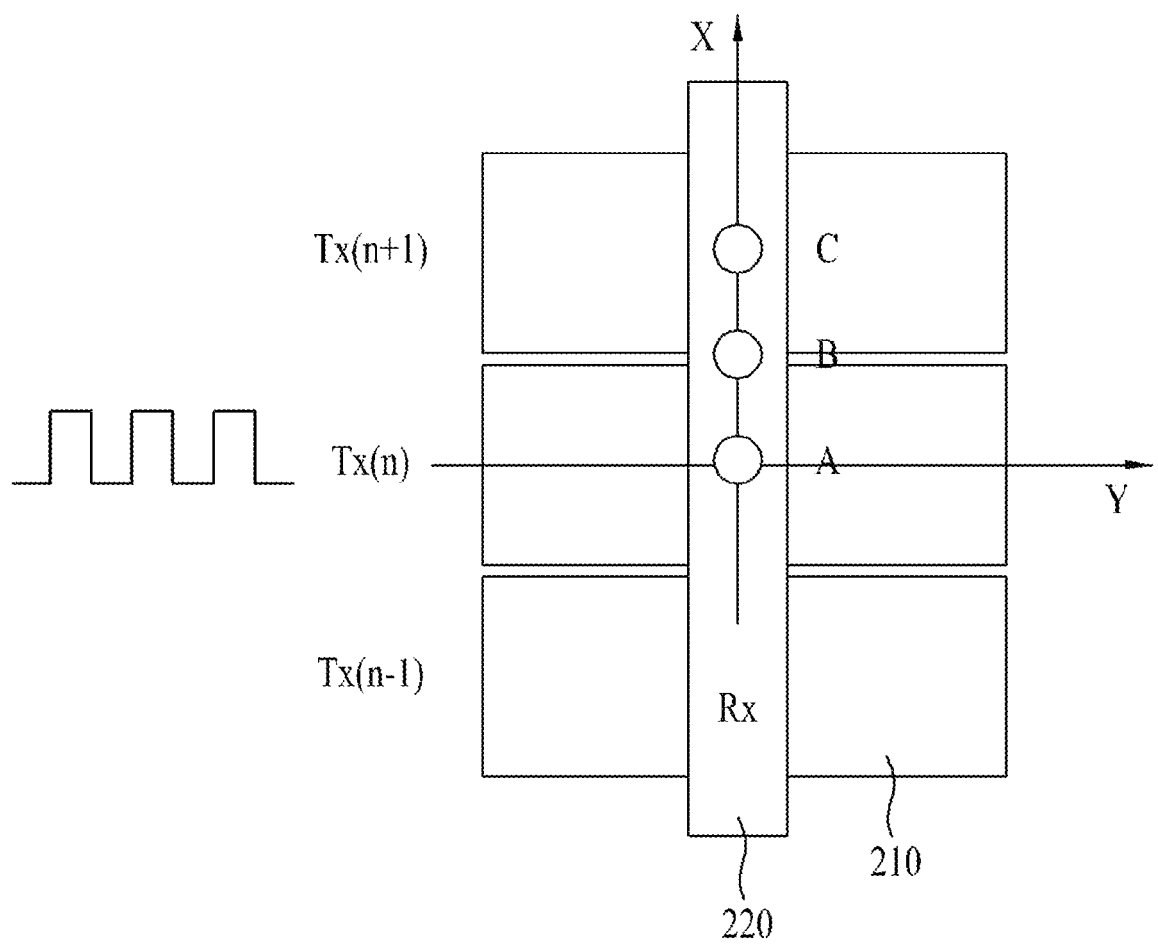
FIG. 15A is a diagram illustrating a positional state of A-C positions of the stylus pen of the input system according to an embodiment.
Figure 15B:
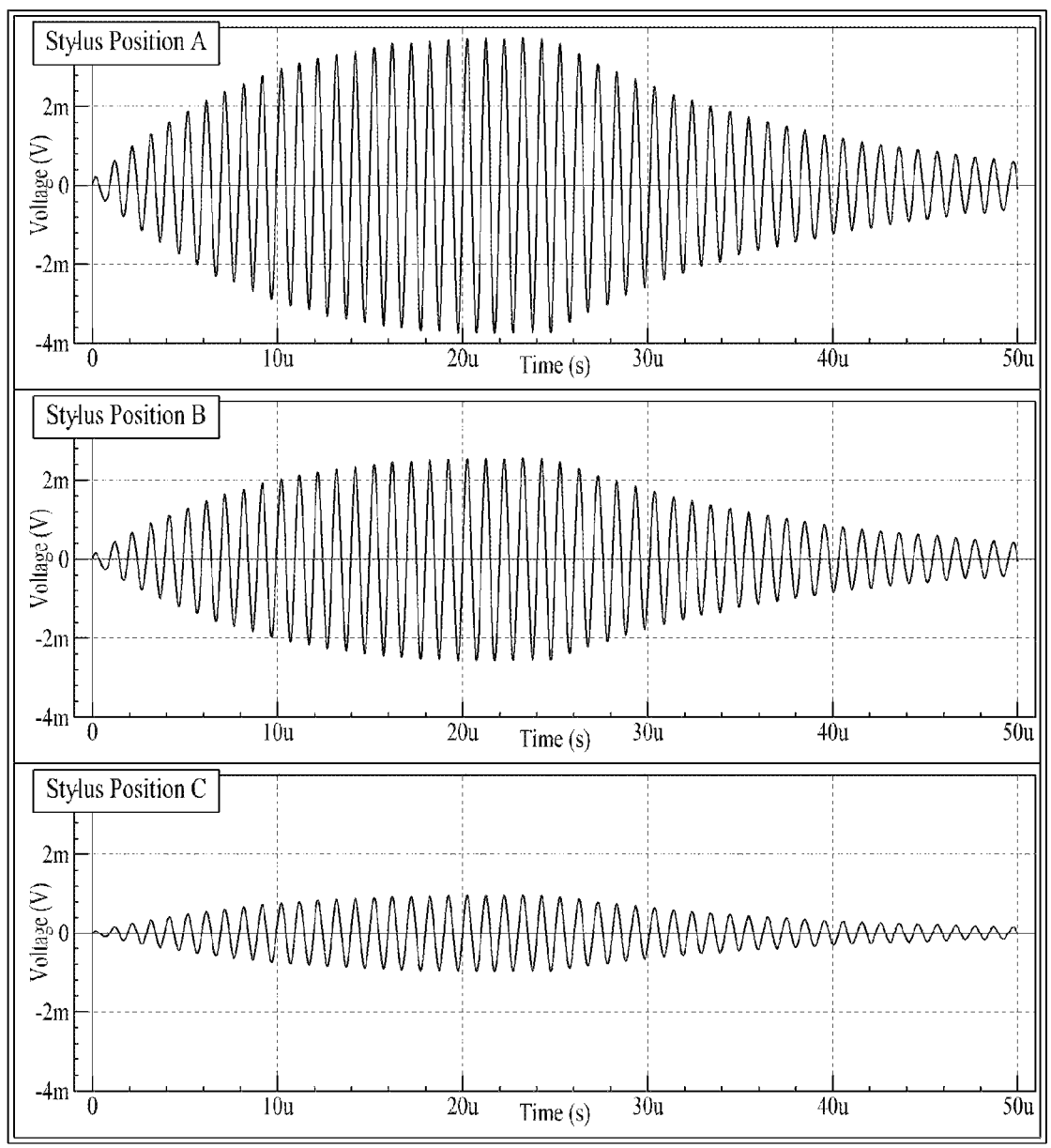
FIG. 15B is a diagram of a signal waveform detected at each of A-C positions of the stylus pen of FIG. 15A.

FIG. 15A is a diagram illustrating a positional state of A-C positions of the stylus pen of the input system according to an embodiment. FIG. 15B is a diagram of a signal waveform detected at each of A-C positions of the stylus pen of FIG. 15A.

As shown in FIG. 15A, when the stylus pen is positioned at A, B, C positions along the X-axis (a vertical direction in the drawing), the drive signal may be applied to the Tx(n) channel and a signal wave form sensed by the antenna loop substantially is shown in FIG. 15B.

The wave form of the sensed signal may be the strongest when the stylus pen is located at the A position that is the center of Tx(n) channel where the drive signal may be applied. The wave form has the middle size when it is positioned at the B position that is a boundary area with a neighboring Tx(n−1) channel. The wave form may be the weakest at the C position corresponding to the middle of Tx(n−1). Thus, the wave form of the sensed signal may be larger as the stylus pen is closer to the channel where the drive signal may be substantially applied, and that the wave form may be smaller as it is farther from the channel where the drive signal may be substantially applied. As such, the wave form may be the largest at the substantially touched position.

The analog signal intensity for each channel may be converted into digital data by the ADC converter 330 (FIG. 6) of the touch controller. After that, the signal processor DSP 340 (FIG. 6) may apply an appropriate algorithm to the digital data to extract the coordinate of the stylus pen touch.

In other words, the channel having the largest wave form may be detected to detect the stylus pen touch substantially.

The input system according to an embodiment and the method for detecting touch using the same may have following advantages.

Compared with the system having panels for the finger touch and the stylus pen touch, respectively, the production cost of the input system may be reduced and the manufacture process may be simplified. Also, a thin sensor panel can be realized as an input system.

Furthermore, the resonance between the resonance circuit provided in the stylus pen and the antenna loop of the sensor panel may enable touch detecting, not requiring any battery in the stylus pen. Compared with the related art active stylus pen requiring an auxiliary power supply, the stylus pen of the input system can reduce the production cost. Also, a smaller and lighter stylus pen can be realized.

Furthermore, the stylus pen touch and the finger touch can be detected distinguishably by different driving modules, respectively, to facilitate palm rejection in the stylus pen touch and to improve the accuracy of the touch sensitivity accordingly.

The sensing capacitance (Csx) generated between the stylus pen and one electrode may be used in detecting touch, not the mutual capacitance between crossing electrodes used in the capacitance type. The larger sensing capacitance may be used in detecting the stylus pen touch so that the sensitivity may be improved.

Meanwhile, the frequency signal of the resonance circuit provided in the stylus pen may be determined by synchronizing the drive signal applied to the electrodes (channels) in the sensor panel. It can be easy to apply auxiliary writing pressure or special button pushing to an embodiment.

Still further, the antenna loop used in detecting the stylus pen touch may be positioned in the outer region spaced apart from the active region where electrodes crossing each other may be formed with respect to the edge area where the sensitivity may be deteriorated. Accordingly, the sensitivity of the stylus pen can be maintained uniformly, regardless of the regions.

It will be apparent to those skilled in the art that various modifications and variations can be made in embodiments of the present invention without departing from the spirit or scope of the invention. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An input system, comprising:
   a sensor panel comprising first and second channels crossing each other;
   a stylus pen comprising:
      a first coil and a second coil divided from each other;
      a resonance capacitor and a switch serially connected to the second coil; and
      a conductive tip connected to the first coil;
   a stylus ground connected to the stylus pen;
   an antenna loop formed in an outer region of the sensor panel; and
   a touch controller connected to the first and second channels and the antenna loop.

2. The input system of claim 1, wherein the first coil and the second coil are wound around a magnetic core positioned in an axial direction of the stylus pen.

3. The input system of claim 2, wherein:
   the first coil and the second coil, the resonance capacitor, and the magnetic core are provided in the stylus pen; and
   a conductive body, comprising a hole which the conductive tip is partially projected through, is provided in the stylus pen.

4. The input system of claim 3, wherein the conductive body is connected to the stylus ground.

5. The input system of claim 3, wherein the switch is formed of elastic rubber and insulated from the conductive tip, to be operated by the pressure applied to the conductive tip.

6. The input system of claim 5, wherein the switch is connected to the second coil and insulated from the magnetic core.

7. The input system of claim 3, wherein an end of the first coil is connected to the conductive tip and the other end thereof is connected to the conductive body.

8. The input system of claim 3, wherein the antenna loop receives an inductance signal resonant from the second coil provided in the stylus pen when the stylus pen touches a face of the sensor panel.

9. The input system of claim 8, wherein:
   the antenna loop is formed to surround an outer area of the sensor panel; and
   pads are provided in both ends of the antenna loop, respectively, and are connected to the touch controller.

10. The input system of claim 8, wherein the stylus ground comprises:
   a user contacting with the conductive body; or
   a wire connected between the conductive body and the sensor panel.

11. The input system of claim 1, wherein the touch controller comprises:
   an amplifier connected to the antenna loop and configured to amplify a difference of voltages received by the ends of the antenna loop;
   a filter unit connected to the amplifier and configured to filter noise;
   a converter connected to the filter unit and configured to convert an analog signal into a digital signal;
   a signal processor connected to the converter and configured to extract a coordinate by collecting the digital signal; and
   a drive signal generator configured to generate a signal applied to each of the channels provided in the sensor.

12. The input system of claim 11, wherein, when the stylus pen touches the sensor panel, the switch is closed and the second coil and the resonance capacitor form a closed circuit.

13. The input system of claim 12, wherein the signal applied to each of the channels by the drive signal generator applies a square wave or sine wave at the same frequency as the resonance frequency in the closed circuit.

14. A method for detecting touch using an input system comprising a sensor panel comprising first and second channels crossing each other, a stylus pen comprising a first coil and a second coil divided from each other, a resonance capacitor and a switch serially connected to the second coil, and a conductive tip connected to the first coil, an antenna loop formed in an outer region of the sensor panel, the method comprising:

dividing finger touch sensing and stylus pen touch sensing for each frame based on time.

15. The method for detecting touch of claim 14, further comprising:

enabling the stylus pen touch sensing by applying signals to the first and second channels sequentially; and detecting touch according to the voltage difference received by both ends of the antenna loop for each driving channel.

16. The method for detecting touch of claim 15, wherein the signal applied to each of the channels by the drive signal generator applies a square wave or sine wave at the same frequency as the resonance frequency in the closed circuit.

17. The method for detecting touch of claim 14, wherein:

the touch detecting is enabled by a capacitive coupling between the sensor panel and the conductive tip which is electrically connected to the first coil;

when the switch is closed, a resonance capacitor and the second coil form a resonance circuit;

the resonance circuit is driven by the first coil through a magnetic coupling between the first coil and the second coil; and an electromagnetic resonance generated in the second coil transmits electromagnetic field which is proportional to strength of resonance to the antenna loop.

18. The method for detecting touch of claim 14, wherein:

the first coil and the second coil, the resonance capacitor, and the magnetic core are provided in the stylus pen;

a conductive body comprising a hole the conductive tip is partially projected through is further provided in the stylus pen; and the other end of the first coil is connected to the conductive body.

19. The method for detecting touch of claim 18, wherein:

the conductive body is connected to the sensor panel via a wire; and the wire is connected to a ground terminal provided in the sensor panel.

20. The method for detecting touch of claim 14, wherein the ground is implemented by a user when a user touching the stylus pen on a face of the sensor panel.

21. The method for detecting touch of claim 20, wherein the ground is implemented by the user's directly contacting the conductive body.

22. The method for detecting touch of claim 14, wherein the antenna loop and the first and second channels comprises pads, respectively, to be connected with each other by a touch controller to enable touch detecting by voltage detecting and signal applying.

23. The method for detecting touch of claim 22, wherein the touch detecting implemented to the first and second channels sequentially by the touch controller comprises:

detecting a voltage difference received by the antenna loop;

amplifying the voltage difference;

filtering noise from the amplified voltage difference;

converting an analog signal of the amplified voltage difference having the noise filtered there into a digital signal;

storing the digital signal in the memory; and detecting a touch coordinate by calculating the digital signal stored in the memory for each of the first and second channels.

24. The method for detecting touch of claim 23, wherein a period in which the signal is applied to each of the first and second channels corresponds to a value given by dividing a period of the stylus pen touch sensing in one frame by the number of the first and second channels.

* * * * *